(12) United States Patent
Takeshima et al.

(10) Patent No.: US 7,628,129 B2
(45) Date of Patent: Dec. 8, 2009

(54) CAMSHAFT, METHOD OF MANUFACTURING CAM FOR CAMSHAFT, AND METHOD OF MANUFACTURING SHAFT FOR CAMSHAFT

(75) Inventors: Fumio Takeshima, Utsunomiya (JP); Koji Satake, Kokubunji (JP); Hideo Kurasawa, Wako (JP); Kozo Ono, Niigata (JP)

(73) Assignee: Honda Motor Co., Ltd., Tokyo (JP)

(*) Notice: Subject to any disclaimer, the term of this patent is extended or adjusted under 35 U.S.C. 154(b) by 247 days.

(21) Appl. No.: 10/582,708

(22) PCT Filed: Dec. 10, 2004

(86) PCT No.: PCT/JP2004/018510

§ 371 (c)(1),
(2), (4) Date: Jun. 12, 2006

(87) PCT Pub. No.: WO2005/056986

PCT Pub. Date: Jun. 23, 2005

(65) Prior Publication Data

US 2007/0144468 A1    Jun. 28, 2007

(30) Foreign Application Priority Data

Dec. 12, 2003  (JP)  ............... 2003-414415
Dec. 12, 2003  (JP)  ............... 2003-414442
Dec. 12, 2003  (JP)  ............... 2003-414521

(51) Int. Cl.
*F01L 1/04* (2006.01)

(52) U.S. Cl. .............. 123/90.6; 123/90.44; 29/888.1; 29/557; 72/352

(58) Field of Classification Search ............. 123/90.27, 123/90.31, 90.6, 90.16, 90.44; 29/888.1, 29/557, 558; 72/343, 352, 361
See application file for complete search history.

(56) References Cited

U.S. PATENT DOCUMENTS

| 4,553,416 | A | * | 11/1985 | Sudoh et al. .............. 72/40 |
| 5,081,858 | A | | 1/1992 | Ito et al. |
| 5,127,253 | A | * | 7/1992 | Takahara et al. .............. 72/356 |
| 6,367,439 | B1 | | 4/2002 | Nishioka et al. |
| 7,134,939 | B2 | * | 11/2006 | Shamshidov et al. .......... 451/36 |
| 2003/0159284 | A1 | | 8/2003 | O'Hara et al. |

FOREIGN PATENT DOCUMENTS

DE       201 16 112 U1    12/2001

(Continued)

*Primary Examiner*—Ching Chang
(74) *Attorney, Agent, or Firm*—Arent Fox LLP

(57) ABSTRACT

A method of manufacturing a cam for a camshaft, comprising the steps of continuously applying, to a billet having a volume larger by a specified volume than a final product, a plurality of cold forging steps formed of a preliminary outline upsetting, an outline drawing, a simultaneous piercing of inner and outer diameter surfaces, a press-molding forming excess amount as burrs on the inner diameter surface, a piercing of the inner diameter surface for removing the burrs from the inner diameter surface, and a simultaneous ironing of the inner and outer diameter surfaces. The final finishing (machining) of a cam (profile) surface can be eliminated, and the final product of the cam for the camshaft having a high dimensional accuracy can be provided.

3 Claims, 25 Drawing Sheets

FOREIGN PATENT DOCUMENTS

| | | |
|---|---|---|
| JP | 57-179422 A | 11/1982 |
| JP | 63-75505 U | 5/1988 |
| JP | 63-134807 A | 6/1988 |
| JP | 4-55030 A | 2/1992 |
| JP | 4-138815 | 5/1992 |
| JP | 4-253559 | 9/1992 |
| JP | 5-177542 | 7/1993 |
| JP | 5-293513 | 11/1993 |
| JP | 6-91322 A | 4/1994 |
| JP | 07-026910 A | 1/1995 |
| JP | 8-90139 A | 4/1996 |
| JP | 08-109809 A | 4/1996 |
| JP | 11-280419 | 10/1999 |
| JP | 2000-345268 | 12/2000 |
| JP | 2001-152173 A | 6/2001 |
| JP | 2001-176864 | 6/2001 |
| JP | 2001-181665 A | 7/2001 |
| JP | 2001-198645 A | 7/2001 |
| JP | 2002-124506 | 4/2002 |
| JP | 2002-164332 | 6/2002 |
| JP | 2003-285138 A | 10/2003 |

* cited by examiner

CAMSHAFT, METHOD OF MANUFACTURING CAM FOR CAMSHAFT, AND METHOD OF MANUFACTURING SHAFT FOR CAMSHAFT

CROSS-REFERENCE TO RELATED APPLICATION

This application is a National Stage entry of International Application No. PCT/JP2004/018510 filed Dec. 10, 2004, the entire specification claims and drawings of which are incorporated herewith by reference.

TECHNICAL FIELD

The present invention relates to a camshaft for opening and closing engine valves, a method of manufacturing a cam for the camshaft, and a method of manufacturing a shaft for the camshaft.

BACKGROUND ART

There is known an assembled-type camshaft, which is rotatable in ganged relation to the crankshaft of a gasoline engine or the like, for controlling the timing to open and close the intake and exhaust valves of the gasoline engine.

The assembled-type camshaft has a shaft in the form of a metal pipe fixedly mounted in a shaft insertion hole defined in a cam piece, by means of press-fitting or the like.

One conventional method for manufacturing a camshaft of the type described above is disclosed in Japanese Laid-Open Patent Publication No. 8-90139. According to the disclosed method, a round rod of elongated steel, having a volume that corresponds to a cam to be produced, is heated to a temperature in a range from 1250 to 1280° C., and then subjected to a hot forging process by striking.

Japanese Laid-Open Patent Publication No. 2001-355709 and Japanese Laid-Open Patent Publication No. 2002-147572 disclose the technical concept of employing fine blanking to reduce a die-induced deformation, for achieving both desired forming accuracy and reducing manufacturing costs.

According to the hot forging process disclosed in Japanese Laid-Open Patent Publication No. 8-90139, an oxide layer is formed on the surface of the forged product, and further, burr wrinkles and inclusions are produced on the surface of the forged product by striking. Therefore, the forged product needs to be machined for finishing.

According to the fine blanking process disclosed in Japanese Laid-Open Patent Publication No. 2001-355709 and Japanese Laid-Open Patent Publication No. 2002-147572, since fine blanking is essentially a shearing process, it must be performed in a manner that minimizes ruptured surfaces or die-induced deformations. If a ruptured surface or die-induced deformation is formed on the surface of the produced cam, then surface pressure on the cam tends to be locally increased when the cam surface presses a valve.

The assembled-type camshaft includes a cam and a shaft, which are integrally combined with each other. If the cam were to slip against the shaft, then the crankshaft that operates the camshaft and the valve that is operated by the camshaft are brought out of synchronism with each other. In view of such a problem, Japanese Laid-Open Patent Publication No. 7-293666 proposes a technique of providing a rotation prevention mechanism in a fitting hole of the cam.

Japanese Laid-Open Patent Publication No. 11-107712 discloses a technique for fitting a cam over a hollow shaft while enlarging the shaft by plastic deformation to fix the cam in place.

The techniques disclosed in Japanese Laid-Open Patent Publication No. 7-293666 and Japanese Laid-Open Patent Publication No. 11-107712 both require a machining process for providing the rotation prevention mechanism. In addition, the rotation prevention mechanism makes the shaft and the cam complex in shape.

Japanese Laid-Open Patent Publication No. 52-50963 discloses a technique for forming a camshaft at a low cost by means of cold forging.

The technique disclosed in Japanese Laid-Open Patent Publication No. 52-50963 concerns the production of a camshaft for a brake drum, wherein the camshaft is combined with a cam in the form of a flat plate. The disclosed technique, however, is not applicable to the production of an engine camshaft, because a different type of cam is used to open and close the valves in an engine.

If the shaft and cam are separately produced and then assembled into a camshaft, then the shaft and cam need to be machined to form a rotation prevention mechanism, in order to prevent the cam from rotating relatively to the camshaft. Therefore, an additional machining process for forming such a rotation prevention mechanism is required. In addition, because the rotation prevention mechanism is incorporated therein, the shaft and the cam tend to be complex in shape.

DISCLOSURE OF THE INVENTION

It is an object of the present invention to provide a camshaft, which can be manufactured in a reduced number of manufacturing steps enabling higher productivity.

Another object of the present invention is to provide a method of manufacturing a cam for a camshaft by performing a succession of cold forging steps, thereby dispensing with a final finishing (machining) process, and achieving high dimensional accuracy.

Still another object of the present invention is to provide a method of manufacturing a shaft for a camshaft with a reduced number of manufacturing steps, wherein a cam that is press-fitted over the shaft is less prone to sliding circumferentially.

According to the present invention, a camshaft comprises a shaft formed by cold forging, wherein a powdery lubricant is applied to the surface of the camshaft, and a cam is mounted on the shaft by press-fitting the cam over the shaft.

By thus press-fitting the cam over the shaft, the cam is firmly fixed to the shaft, and no additional process steps are required to secure the cam. Since the cam is fixed in position by press-fitting, there is no need for a rotation prevention mechanism or any process of forming the rotation prevention mechanism. Consequently, the camshaft can be manufactured using a reduced number of steps, enabling higher productivity. Productivity is also increased since the shaft itself is formed by cold forging.

The powdery lubricant may be lime or borax.

If the shaft has a flat surface formed by shearing, then the shaft can avoid interference with another member such as a connecting rod or the like. The shearing process for forming the flat surface maintains the dimensional accuracy of the shaft, which has been formed by cold forging.

If the shaft has a cut surface defined on a side thereof by shearing, then the shaft can avoid interference with another member such as a connecting rod or the like. The shearing process for forming the cut surface maintains the dimensional accuracy of the shaft, which has been formed by cold forging.

The cam may have a shaft insertion hole defined therein. The shaft insertion hole can easily be formed in the cam by punching.

The camshaft may further include a gear mounted on the shaft, wherein the gear is press-fitted over the shaft. The gear may be made of synthetic resin and have a metal bushing disposed centrally therein, wherein the metal bushing is press-fitted over the shaft.

The shaft may have a step providing different diameters on both sides thereof. When the cam is positioned by abutment against the step, the cam can easily and accurately be positioned.

According to the present invention, there is also provided a method of manufacturing a cam for a camshaft of an engine. According to the method, preliminary profile upsetting is performed on a forging blank having a volume which is greater, by a predetermined amount, than a final product, thereby forming a first cold-forged body having a rough shape.

Profile drawing is performed on the first cold-forged body to form a second cold-forged body, wherein the second cold-forged body has excessive material, which flows along a profile thereof, and being formed as a burr on an outer surface thereof.

The second cold-forged body is punched to form inner and outer surfaces simultaneously thereon, thereby forming a third cold-forged body, wherein the burr is removed from the outer surface and a relief hole, which is smaller in diameter than a shaft insertion hole for the camshaft, is formed therein.

The third cold-forged body is pressed into a fourth cold-forged body having a predetermined thickness, wherein excessive material is formed as a burr on the inner surface thereof.

The fourth cold-forged body is punched to remove the burr from the inner surface, thereby forming a fifth cold-forged body having a hole corresponding to the shaft insertion hole.

Finally, the fifth cold-forged body is ironed simultaneously on inner and outer surfaces thereof, thereby forming a final product. The final product thus produced does not require a finishing process, such as a cutting or polishing process on a cam (profile) surface, and has desired dimensional accuracy and surface roughness.

When preliminary profile upsetting is performed on the forging blank, first and second beveled facets may be formed on peripheral portions of the first cold-forged body. The first beveled facet is formed on a peripheral portion of a surface of the first cold-forged body, which is positioned near the burr formed by profile drawing on the outer surface, and the second beveled facet is formed on a peripheral portion of a surface of the first cold-forged body, which is opposite to the first-mentioned surface thereof, wherein the first beveled facet has an area greater than the second beveled facet. Since the area of the first beveled facet is greater than the area of the second beveled facet, the profile drawing process is smoothly performed.

According to the present invention, there is further provided a method of manufacturing a shaft for a camshaft of an engine, comprising the steps of coating an outer circumferential surface of a cylindrical blank with a powdery lubricant, axially pressing an end of the blank to draw the blank into a workpiece having a plurality of diameters, axially pressing the end of the workpiece and fixing an opposite end thereof, so as to expand a portion of the workpiece radially outwardly into an annular expanded portion, and axially pressing the annular expanded portion into a flange while drawing the workpiece into a workpiece having a plurality of diameters, wherein the steps of axially pressing the end of the blank and the end of the workpiece are performed by cold forging.

By cold-forging the blank after it has been coated with a powdery lubricant, the cam that is press-fitted over the shaft is less liable to slip in the circumferential direction, and the finished product can be manufactured in a reduced number of steps.

BEST MODE FOR CARRYING OUT THE INVENTION

A camshaft, a method of manufacturing a cam for the camshaft, and a method of manufacturing a shaft for the camshaft according to an embodiment of the present invention will be described in detail below with reference to the accompanying drawings.

Figure 1:
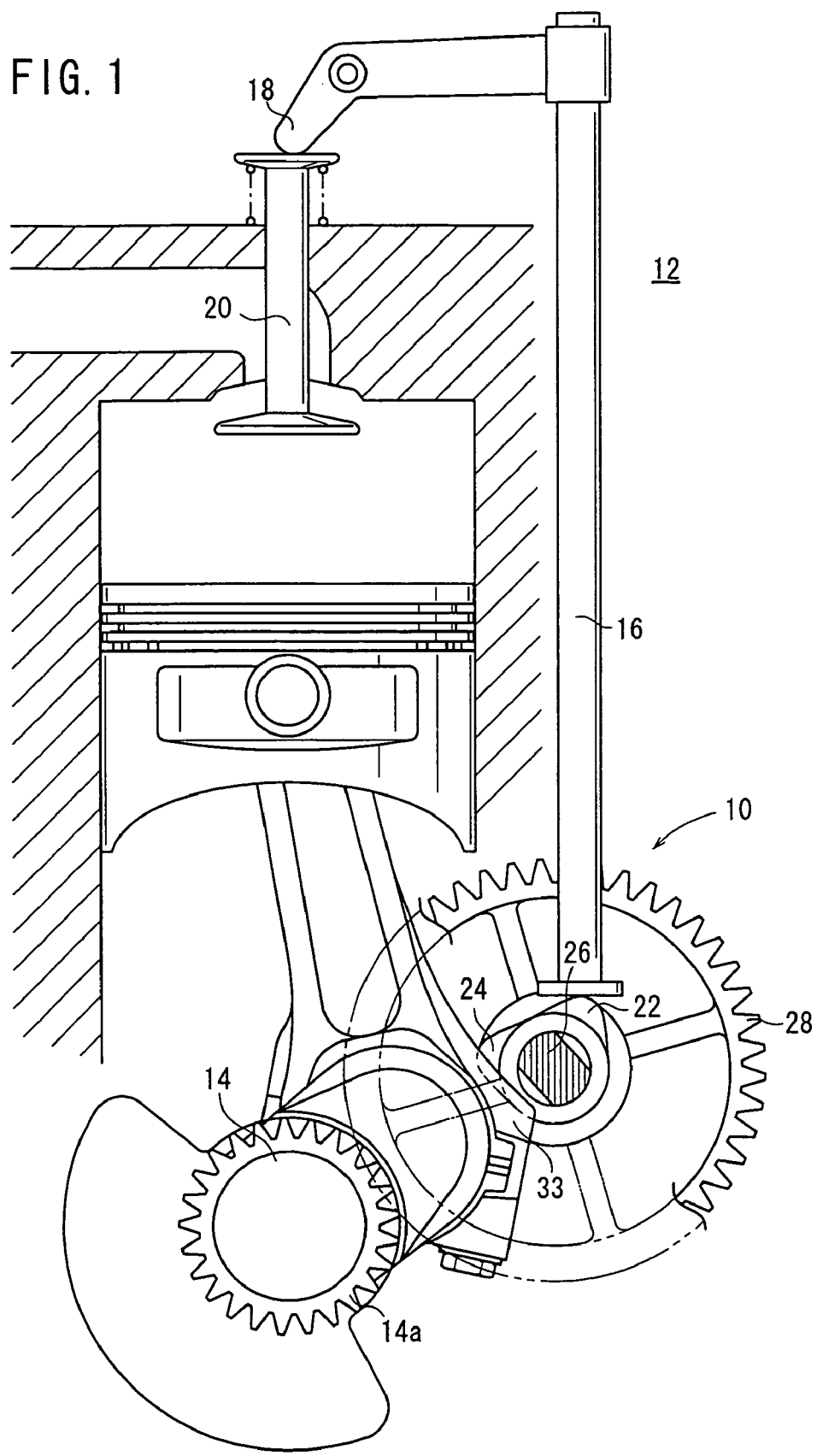
FIG. 1 is a schematic view of an engine incorporating a camshaft, manufactured by a method of manufacturing a cam for the camshaft, according to an embodiment of the present invention.

FIG. 1 schematically shows an engine 12, incorporating an assembled-type camshaft 10 manufactured by a method of manufacturing a cam for a camshaft according to an embodiment of the present invention. The camshaft 10 is used in the engine 12, which may be a single-cylinder engine, for example. The camshaft 10 pushes push rods 16 (one shown) upwardly in synchronism with rotation of a crankshaft 14, in order to operate rocker arms 18 (one shown) for opening and closing valves 20.

The valves 20 include two valves, i.e., intake and exhaust valves, which are associated with respective rocker arms 18 and respective push rods 16. The camshaft 10 has two cams 22, 24, which are angularly held out of phase with each other, i.e., angularly spaced from each other, for individually pushing the respective push rods 16 upwardly.

Figure 2:
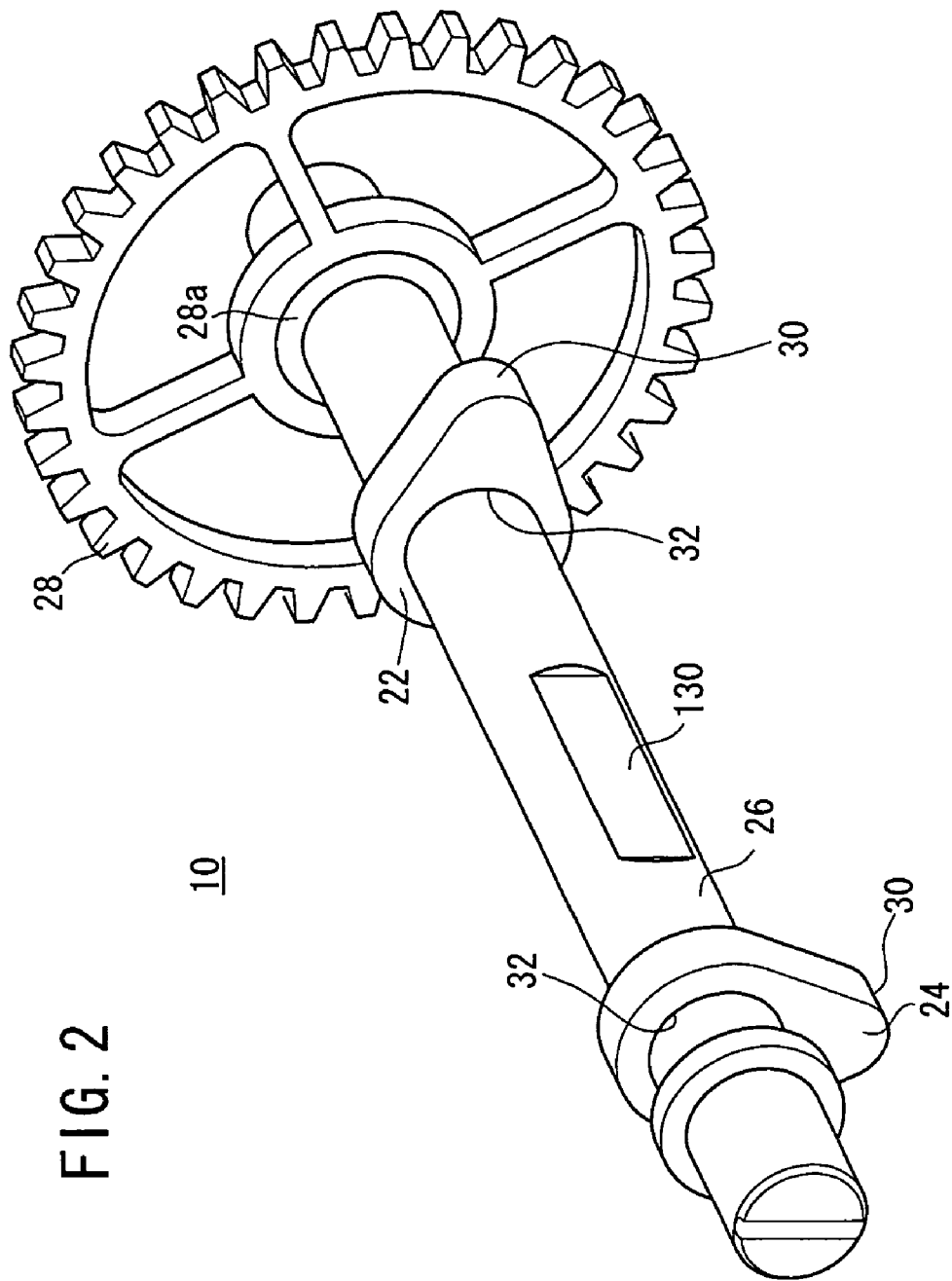
FIG. 2 is a perspective view of the camshaft shown in FIG. 1.

As shown in FIG. 2, the camshaft 10 has a shaft 26 formed by cold forging, cams 22, 24 press-fitted over the shaft 26, and a gear 28 made of a synthetic resin, e.g., nylon, mounted on an end of the shaft 26 and held in mesh with a drive gear 14a (see FIG. 1) on the crankshaft 14 for rotating the shaft 26 about its own axis. The gear 28 has a metal bushing 28a disposed centrally therein, which is made of carbon steel such as S35C (carbon steel for use in machines and structures having a carbon content in a range from 0.32 to 0.38 weight %) according to JIS G4051, for example. The metal bushing 28a is press-fitted over the shaft 26.

The gear 28 is formed by injection-molding the synthetic resin, preferably with the metal bushing 28a inserted in position. Since the metal bushing 28a is mounted in the gear 28, the gear 28 can reliably be press-fitted over and tightened on the shaft 26. The synthetic resin gear 28 can be manufactured with high production efficiency, using a process such as injection molding, and is lighter than metal gears.

However, the gear 28 may also be made of metal, by pressing, machining, or sintering, depending on the specifications of the engine 12.

Each of the cams 22, 24 has a cam (profile) surface 30 held in contact with a lower end face of the push rod 16 for pressing the push rod 16 upwardly, and a shaft insertion hole 32 defined therethrough for insertion of the shaft 26 therein (see FIG. 2).

A process of manufacturing the cams 22, 24 will be described below with reference to FIGS. 3 through 31.

Figure 3:
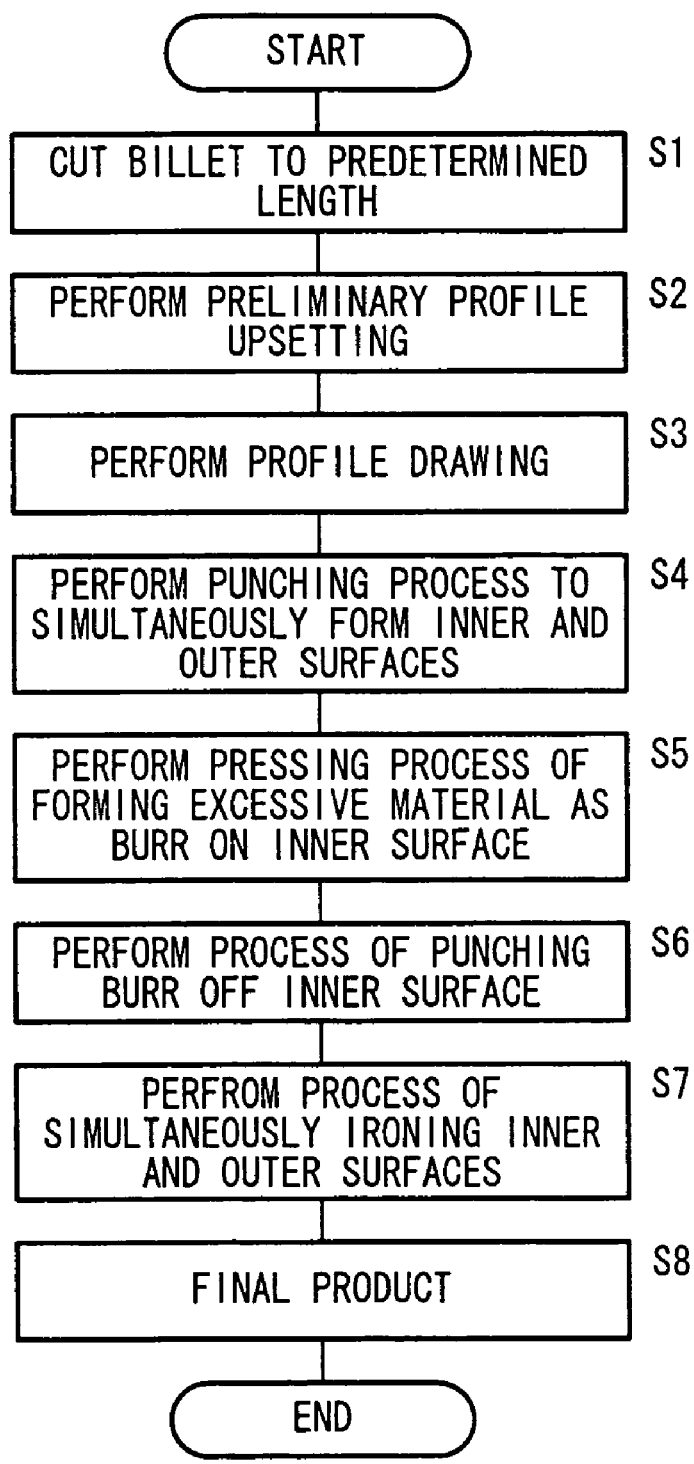
FIG. 3 is a flowchart of the manufacturing process used for manufacturing the cam for the camshaft according to an embodiment of the present invention.
Figure 4:
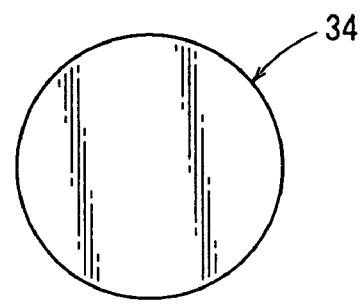
FIG. 4 is a plan view of a billet cut to a predetermined length.
Figure 5:
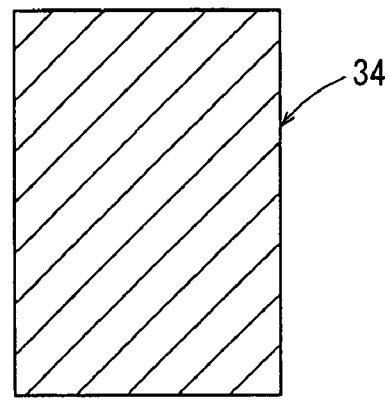
FIG. 5 is an axial cross-sectional view of the billet.
Figure 6:
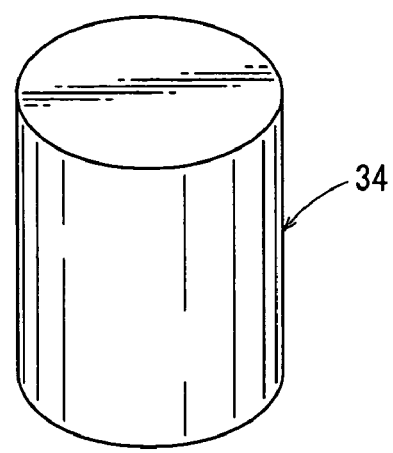
FIG. 6 is a perspective view of the billet.
Figure 7:
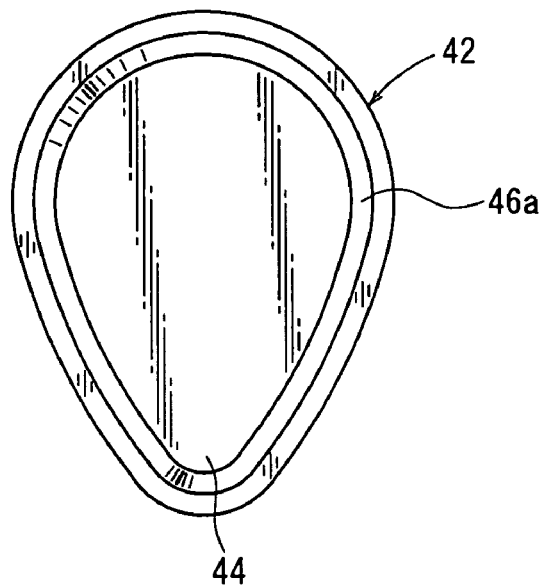
FIG. 7 is a plan view of a first cold-forged body produced when the billet is subjected to preliminary profile upsetting by a first cold-forging die assembly.
Figure 8:
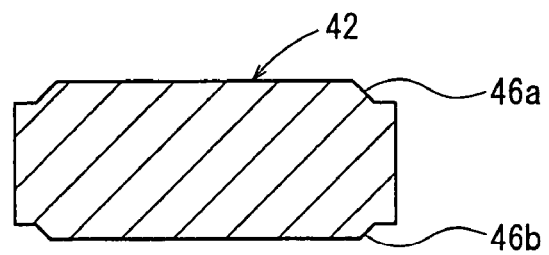
FIG. 8 is an axial cross-sectional view of the first cold-forged body.

In step S1, as shown in FIG. 3, a rod (not shown) is cut to a predetermined length, for producing a cylindrical billet 34, which serves as a forging blank (see FIGS. 4 through 6). The billet 34 has a volume, which does not correspond to the volume of the cam 22 or 24 as finally produced, but which corresponds to the sum of the volume of the finally produced cam 22 or 24 and the volume of burrs to be removed therefrom. The billet 34 may be produced by shearing a coil member (not shown).

Figure 10:
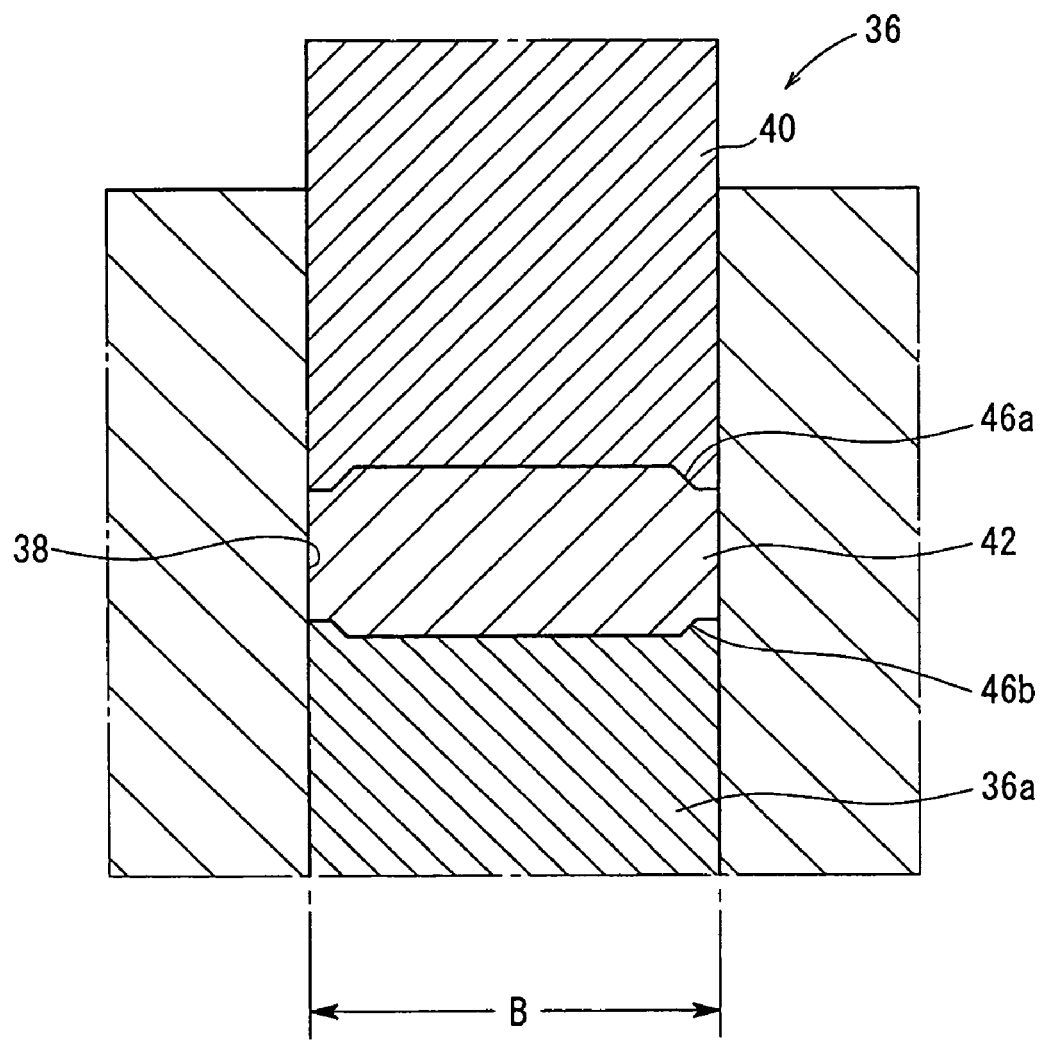
FIG. 10 is an axial cross-sectional view of the first cold-forging die assembly.
Figure 11:
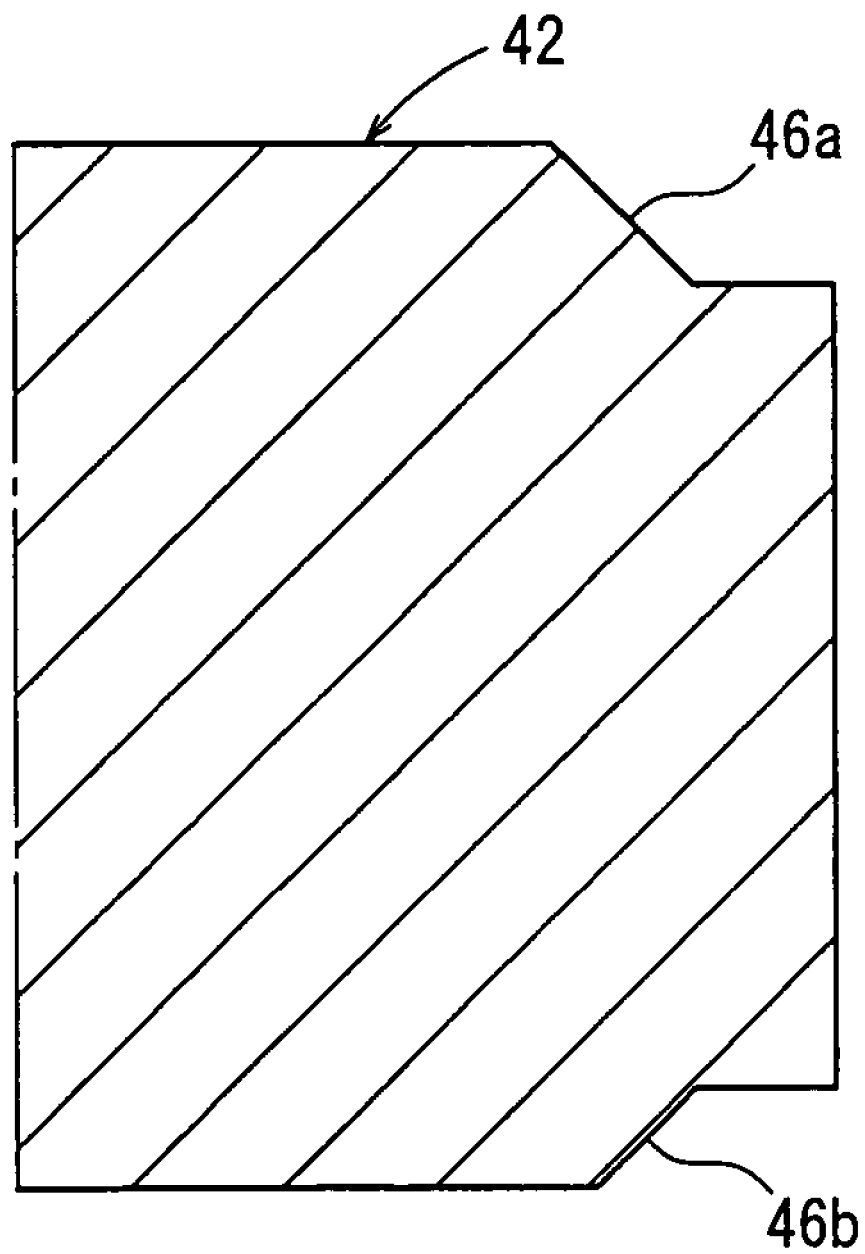
FIG. 11 is an enlarged fragmentary axial cross-sectional view of the first cold-forged body shown in FIG. 8.
Figure 12:
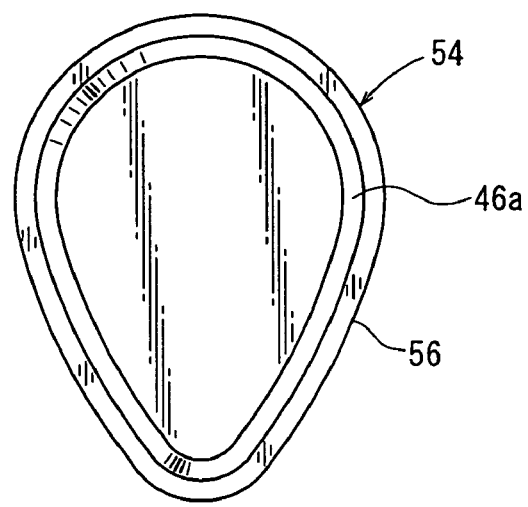
FIG. 12 is a plan view of a second cold-forged body produced when the first cold-forged body is subjected to profile drawing by a second cold-forging die assembly.

In step S2, the billet 34 produced in step S1 is loaded into a cavity 38 of a first cold-forging die assembly 36, as shown in FIG. 10, and pressed by a punch 40 for performing preliminary profile upsetting.

During the preliminary profile upsetting process, the billet 34 is pressed downwardly by the punch 40 into a first cold-forged body 42 (see FIGS. 7 through 9) having a rough shape which is thicker than a final product, and which has an outer profile (width) greater than the final product.

Figure 9:
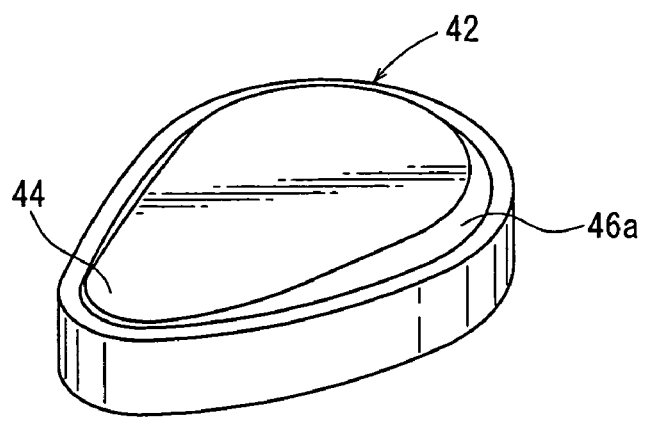
FIG. 9 is a perspective view of the first cold-forged body.

The first cold-forged body 42 includes a portion, which has been plastically deformed by the punch 40, but which has not flowed sufficiently toward a tip end 44 providing a cam surface. Therefore, the tip end 44 is thinner than the remaining portion of the first cold-forged body 42, as shown in FIG. 9.

The first cold-forged body 42 has a first annular slanted beveled facet 46a formed on the peripheral portion of an upper surface (one surface) thereof, and a second annular slanted beveled facet 46b formed on the peripheral portion of a lower surface (other surface) thereof. The first annular slanted beveled facet 46a on the upper surface has an area which is greater than that of the second annular slanted beveled facet 46b on the lower surface (see FIG. 11). In the first cold-forging die assembly 36, the punch 40 is positioned upwardly, whereas a lower die 36a is positioned downwardly.

The first and second beveled facets 46a, 46b on the upper and lower surfaces of the first cold-forged body 42 are effective to prevent a ruptured surface from producing a burr, when a burr 56 on the outer surface of the first cold-forged body 42 is cut off in step S4, as described later. Therefore, no deburring process in required in step S4, and thus step S4 can be simplified.

Figure 15:
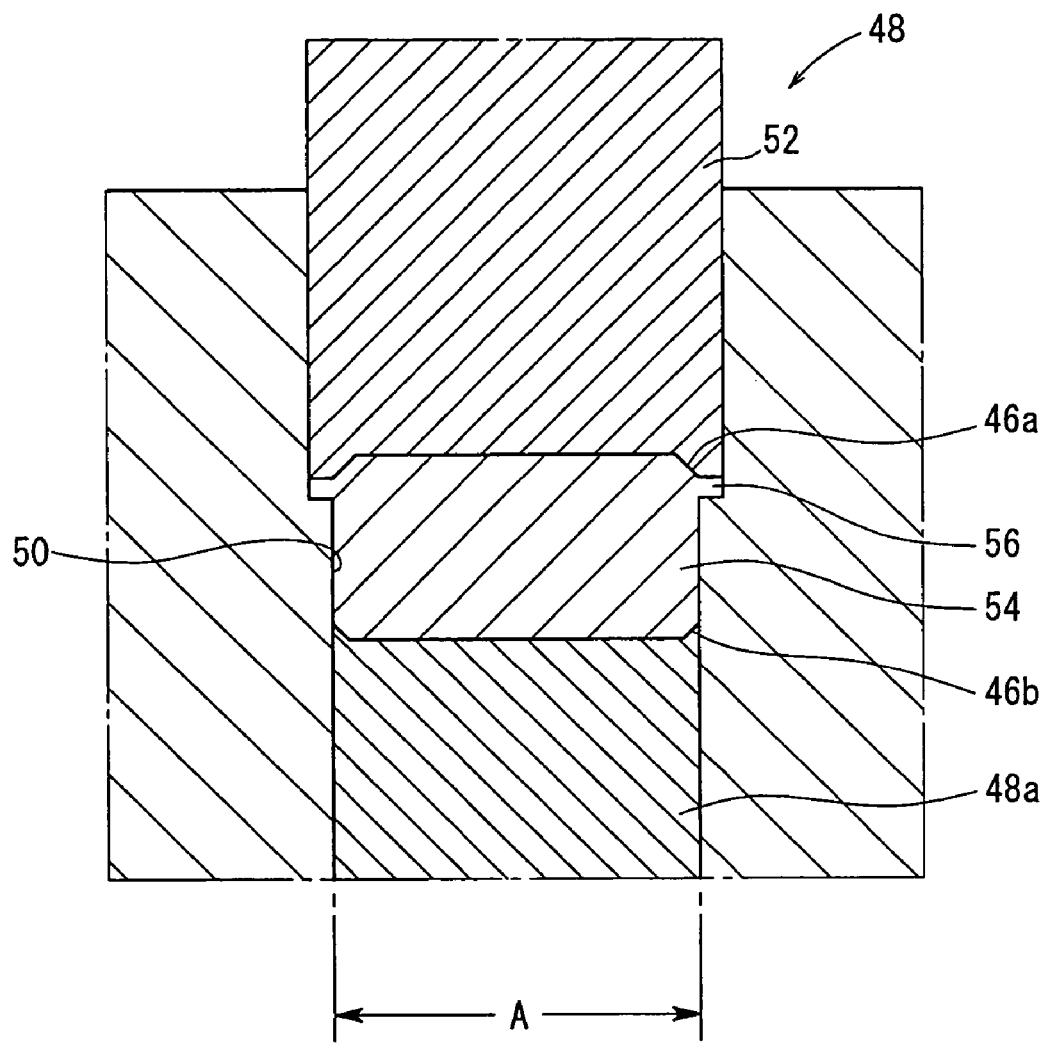
FIG. 15 is an axial cross-sectional view of the second cold-forging die assembly.
Figure 16:
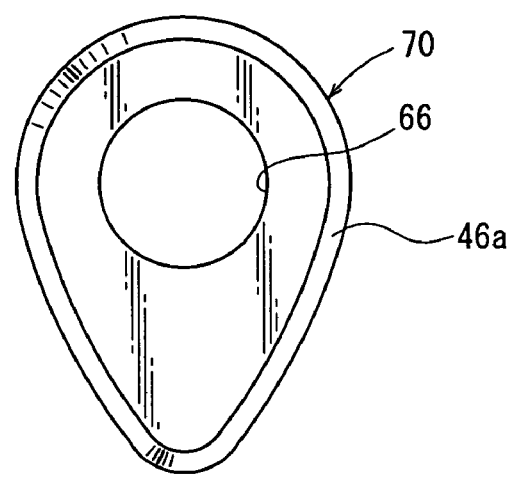
FIG. 16 is a plan view of a third cold-forged body produced when the second cold-forged body is punched to produce inner and outer surfaces simultaneously by a third cold-forging die assembly.
Figure 17:
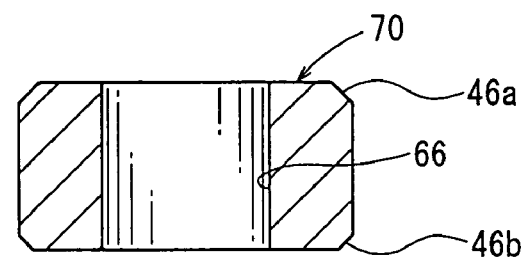
FIG. 17 is an axial cross-sectional view of the third cold-forged body.
Figure 18:
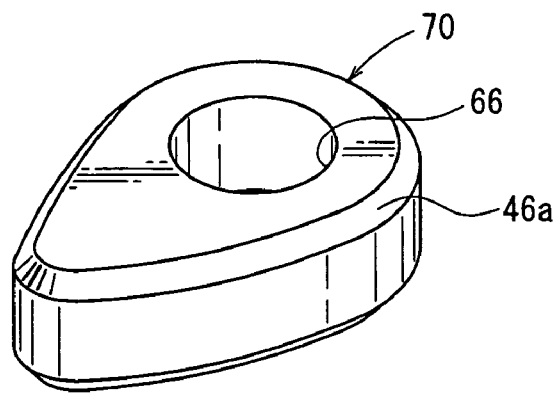
FIG. 18 is a perspective view of the third cold-forged body.

In step S3, the first cold-forged body 42 produced in step S2 is loaded into a cavity 50 of a second cold-forging die assembly 48, as shown in FIG. 15, and pressed by a punch 52 for performing profile drawing.

So that profile drawing may be performed smoothly, the cavity 50, which is defined between the punch 52 and a lower die 48a of the second cold-forging die assembly 48, has a width A, which is smaller than the width B of the cavity 38 in the first cold-forging die assembly 36 (see FIGS. 10 and 15 for comparison).

During the profile drawing process, the first cold-forged body 42 is pressed downwardly by the punch 52, to cause the plastically deformed material to flow along the profile of an outer circumferential surface that corresponds to the shape of the final product, thereby forming a second cold-forged body 54 (see FIGS. 11 through 14) wherein the tip end 44a, which was not sufficiently filled in the preliminary profile upsetting process, is sufficiently filled with the plastically deformed material.

Figure 13:
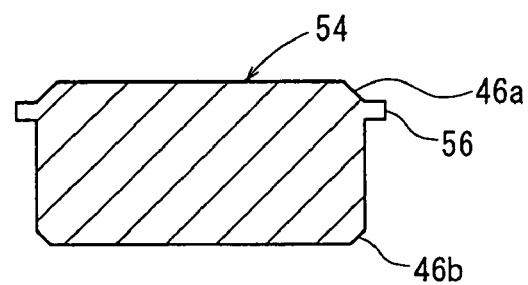
FIG. 13 is an axial cross-sectional view of the second cold-forged body.
Figure 14:
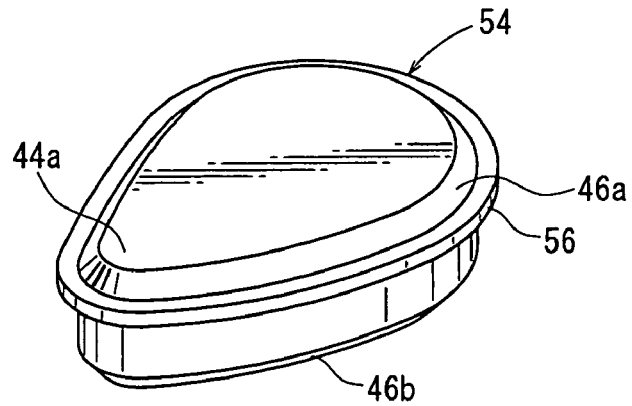
FIG. 14 is a perspective view of the second cold-forged body.

The second cold-forged body 54 has an annular burr 56 on the outer circumferential surface thereof near its upper surface, the burr 56 being formed from an excessive material that has flowed along the profile of the outer circumferential surface (see FIG. 13). The profile drawing process is performed along the profile of the outer circumferential surface, without affecting the first and second beveled facets 46a, 46b that were formed in the previous process.

Figure 19:
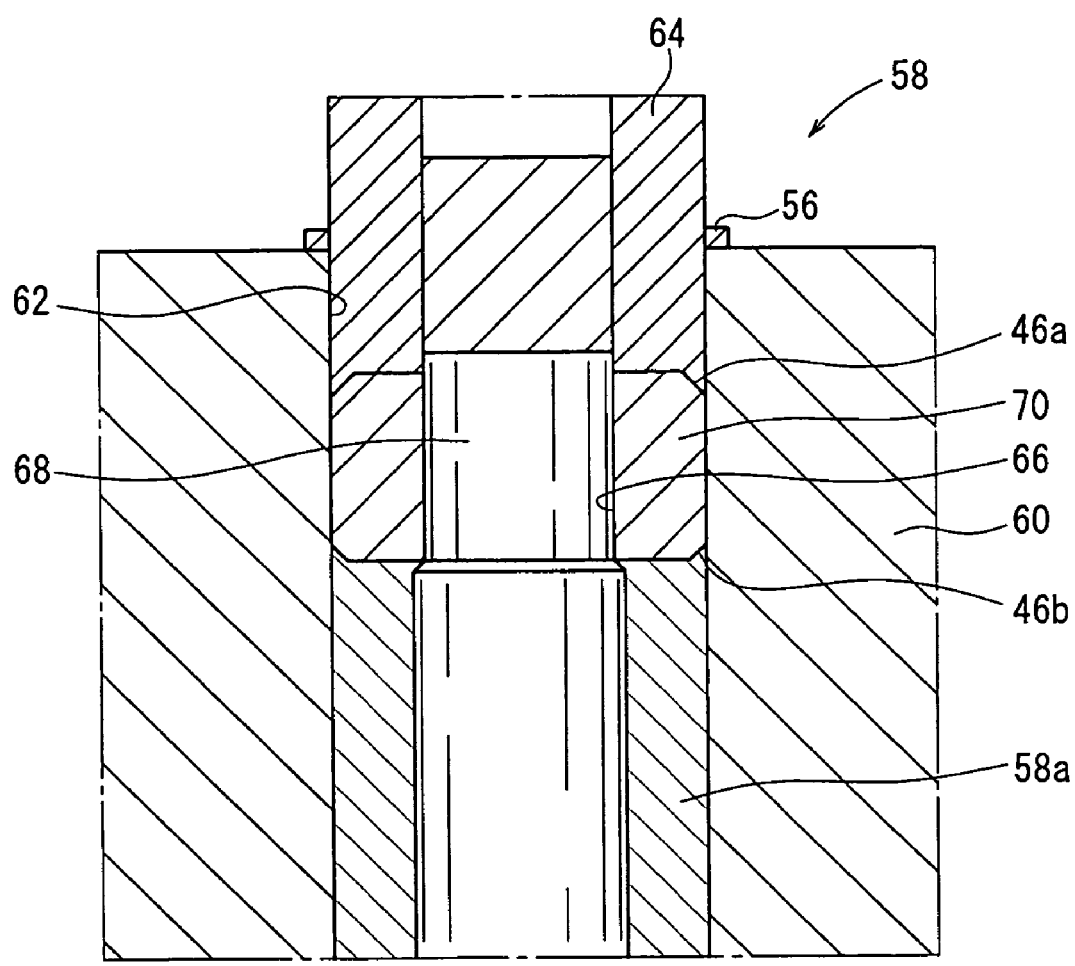
FIG. 19 is an axial cross-sectional view of the third cold-forging die assembly.
Figure 20:
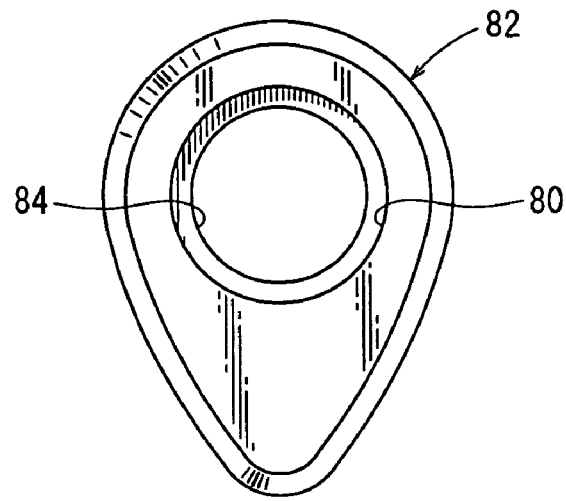
FIG. 20 is a plan view of a fourth cold-forged body produced when the third cold-forged body is pressed to form excessive material as a burr by a fourth cold-forging die assembly.
Figure 21:
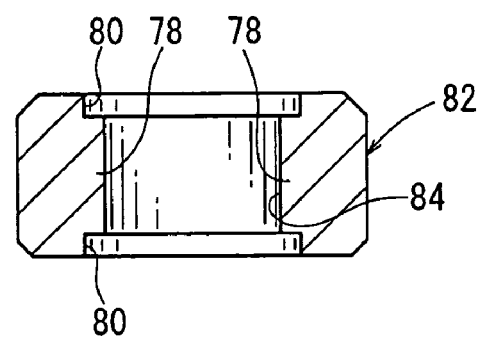
FIG. 21 is an axial cross-sectional view of the fourth cold-forged body.
Figure 22:
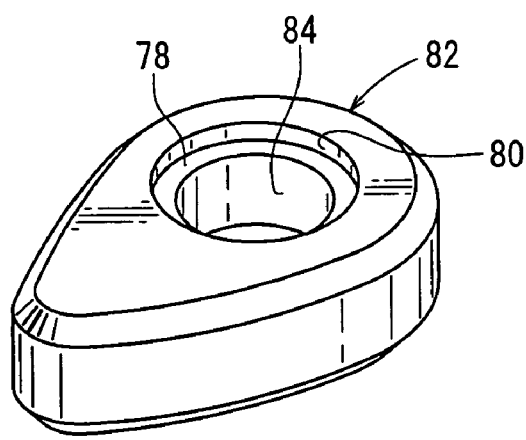
FIG. 22 is a perspective view of the fourth cold-forged body.

In step S4, the second cold-forged body 54 produced in step S3 is loaded into a third cold-forging die assembly 58, as shown in FIG. 19, and pressed downwardly by a hollow punch 64 inserted into a hole 62 defined in a die 60, thereby removing the burr 56 projecting on the outer circumferential surface of the second cold-forged body 54. At the same time, for allowing excessive material to flow in the following and subsequent steps, the second cold-forged body 54 is punched at a position where the shaft 26 will be inserted, by a fixed punch 68 which is fixed to a lower die 58a of the third cold-forging die assembly 58, thereby forming a relief hole 66 therein, wherein the diameter of the relief hole 66 is smaller than the inside diameter of the shaft insertion hole 32 in the final product. In this manner, the second cold-forged body 54 is punched to produce inner and outer surfaces simultaneously by the third cold-forging die assembly 58.

After the second cold-forged body 54 is punched to produce the inner and outer surfaces simultaneously by the third cold-forging die assembly 58, a third cold-forged body 70 (see FIGS. 16 through 18) is formed, which has a ruptured surface free of burrs and high surface accuracy, because the outer circumferential surface is ironed when the burr 56 is punched off. Further, the relief hole 66 defined in the inner surface is smaller in diameter than the shaft insertion hole 32.

The relief hole 66 is formed to allow excessive material to flow only on the inner surface, while the outer circumferential surface is constrained, in the following and subsequent steps.

Figure 23:
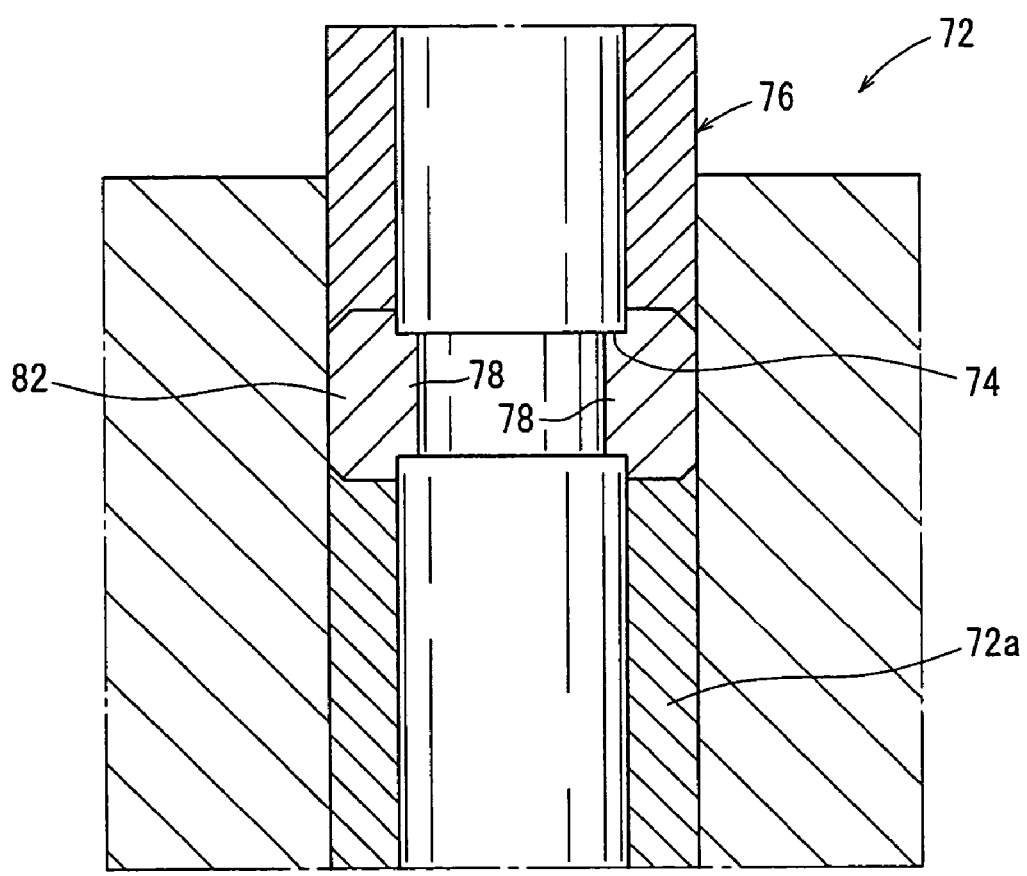
FIG. 23 is an axial cross-sectional view of the fourth cold-forging die assembly.
Figure 24:
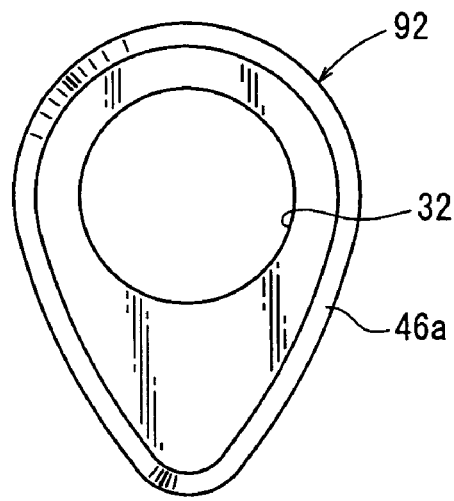
FIG. 24 is a plan view of a fifth cold-forged body produced when the fourth cold-forged body is punched to remove the burr from its inner surface by a fifth cold-forging die assembly.
Figure 25:
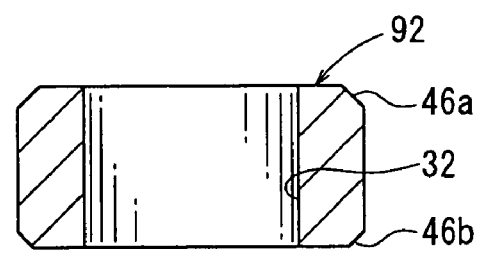
FIG. 25 is an axial cross-sectional view of the fifth cold-forged body.
Figure 26:
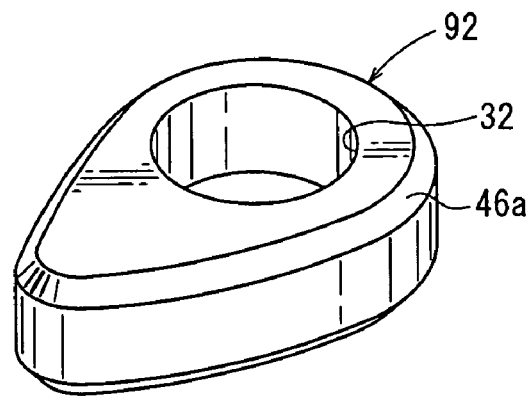
FIG. 26 is a perspective view of the fifth cold-forged body.

In step S5, the third cold-forged body 70 produced in step S4 is loaded into a cavity of a fourth cold-forging die assembly 72, as shown in FIG. 23. While the outer circumferential surface of the third cold-forged body 70 is constrained by a die surface of the fourth cold-forging die assembly 72, the third cold-forged body 70 is pressed downwardly by a punch 76 having an annular step 74 that projects a certain length toward a lower die 72a, thereby providing the cold-forged body with a predetermined thickness and forming an excessive flowing material, as a burr 78, on the inner surface thereof.

When the third cold-forged body 70 is pressed in this manner, a fourth cold-forged body 82 (see FIGS. 20 through 22) is formed, having guide holes 80 in the relief hole 66 near the upper and lower surfaces, in preparation for punching the inner surface in the next step, and also having a thickness which is essentially the same as the thickness of the final product.

The fourth cold-forged body 82 has a through hole 84 extending transversely between the guide holes 80, for allowing material to flow easily when the burr 78 is removed from the inner surface in the next step.

Figure 27:
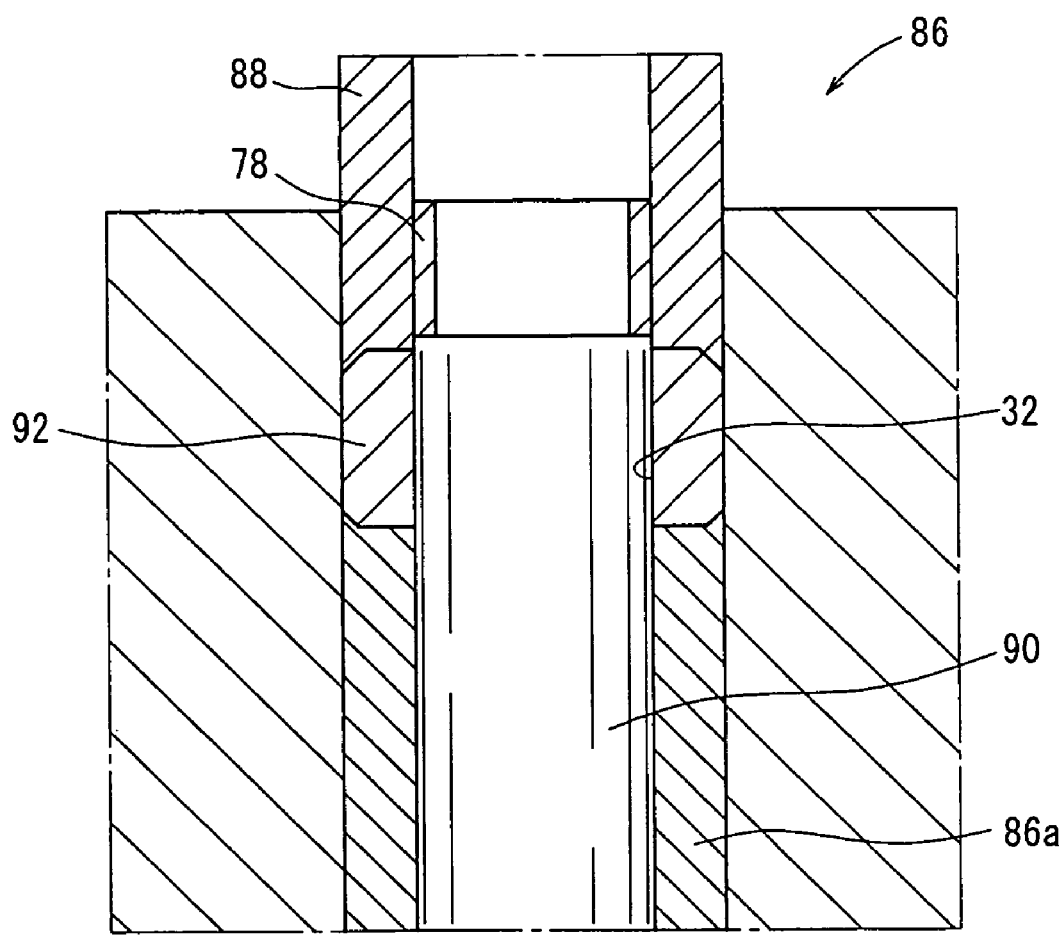
FIG. 27 is an axial cross-sectional view of the fifth cold-forging die assembly.

In step S6, the fourth cold-forged body 82 produced in step S5 is loaded into a cavity of a fifth cold-forging die assembly 86, as shown in FIG. 27. While the outer circumferential surface of the fourth cold-forged body 82 is constrained by a die surface of the fifth cold-forging die assembly 86, the upper surface of the fourth cold-forged body 82 is pressed downwardly by a hollow punch 88. Thus, a fixed punch 90 which is fixed to a lower die 86a of the fifth cold-forging die assembly 86 removes the burr 78 from the inner surface of the fourth cold-forged body 82 in an inner surface punching process.

During the inner surface punching process, the burr 78 is punched off the inner surface of the fourth cold-forged body 82, thereby forming a fifth cold-forged body 92 (see FIGS. 24 through 26) having a shaft insertion hole 32 defined therein which has a predetermined inside diameter.

Figure 31:
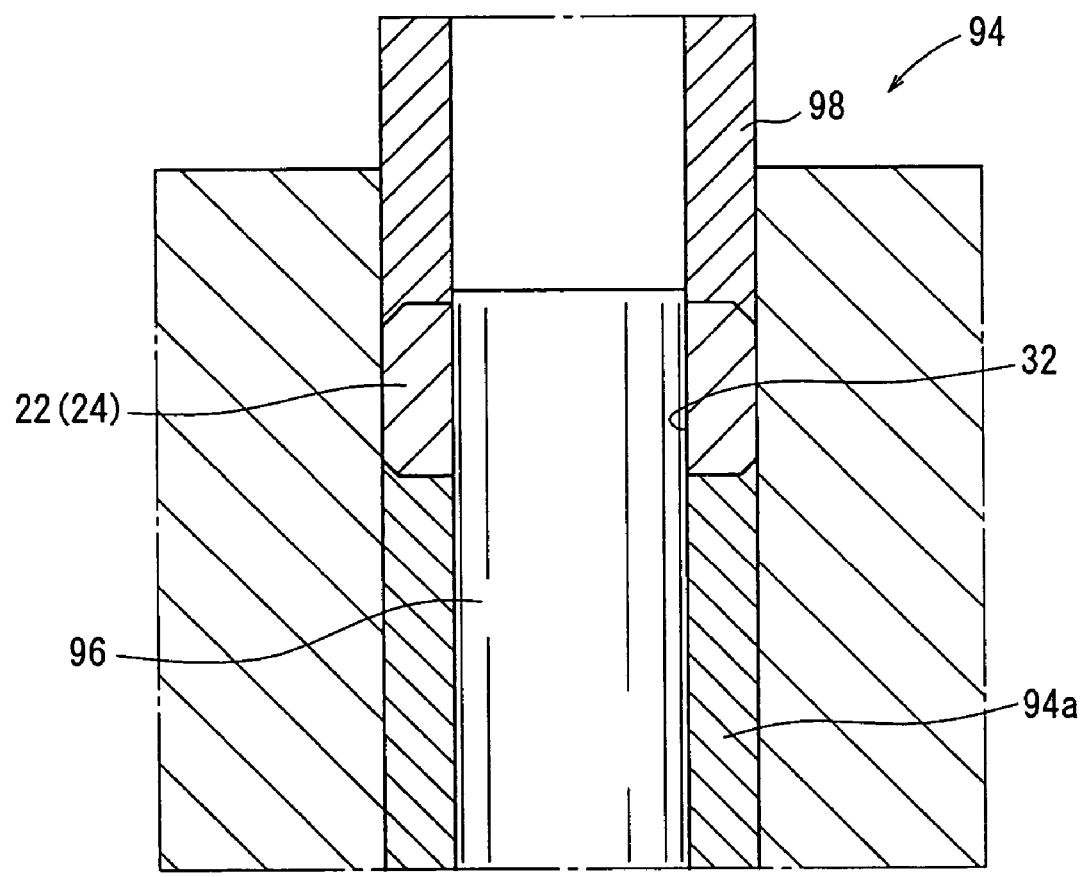
FIG. 31 is an axial cross-sectional view of the sixth cold-forging die assembly.

In step S7, the fifth cold-forged body 92 produced in step S6 is loaded into a cavity of a sixth cold-forging die assembly 94, as shown in FIG. 31. While the outer circumferential surface of the fifth cold-forged body 92 is constrained by a die surface of the sixth cold-forging die assembly 94, the upper surface of the fifth cold-forged body 92 is pressed downwardly by a hollow punch 98. Thus, a fixed punch 96 which is fixed to a lower die 94a of the sixth cold-forging die assembly 94 enters the shaft insertion hole 32, simultaneously ironing the inner and outer surfaces of the fifth cold-forged body 92.

Figure 28:
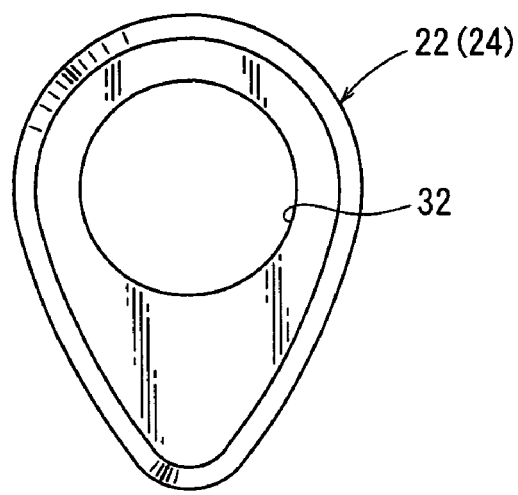
FIG. 28 is a plan view of a final product produced when the fifth cold-forged body is ironed simultaneously on inner and outer surfaces thereof by a sixth cold-forging die assembly.
Figure 29:
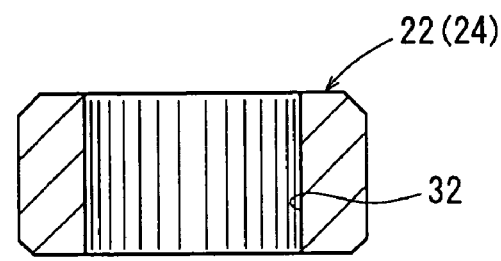
FIG. 29 is an axial cross-sectional view of the final product.
Figure 30:
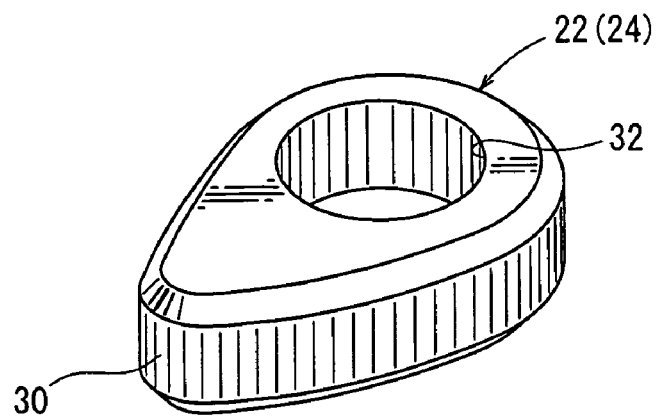
FIG. 30 is a perspective view of the final product.

After the inner and outer surfaces of the fifth cold-forged body 92 are simultaneously ironed, the fifth cold-forged body 92 is formed into the final product (see FIGS. 28 through 30). More specifically, in step S8, a cam 22, 24 is produced, which has a predetermined surface roughness on inner and outer surfaces thereof. The processes, from step S2 to step S8, may be performed continuously by a header or a forging press.

The shaft insertion holes 32 of the cams 22 and 24 may have different diameters, depending on the diameters at the portions of the shaft 26 where the cams 22, 24 are to be press-fitted. To form shaft insertion holes 32 of different diameters, fixed punches 96 having corresponding different diameters may be used.

In the present embodiment, the first through sixth cold-forging die assemblies 36, 48, 58, 72, 86, 94 are used to successively perform a plurality of respective cold-forging processes, including the preliminary profile upsetting process, the profile drawing process, the process of simultaneously forming inner and outer surfaces, the pressing process of forming excessive material as a burr 78 on the inner surface, the process of punching the burr 78 off the inner surface, and the process of simultaneously ironing the inner and outer surfaces, thereby producing a final product, wherein the final product does not require final finishing (machining) on the cam (profile) surface and achieves high dimensional accuracy.

According to the present embodiment, therefore, the final product is free of any ruptured surface or die-induced deformations on the outer circumferential surface thereof, while having a predetermined surface roughness on the cam surface, and provides a predetermined fitting dimension for the shaft insertion hole into which the shaft is inserted.

According to the present embodiment, a billet 34 is used which has a volume greater than the volume of the final product. Excessive material, as a burr 56, is formed on the outer circumferential surface of the cold-forged body by the profile drawing process, and further excessive material, as a burr 78, is formed on the inner surface of the cold-forged body by the pressing process, wherein the burr 56 on the outer circumferential surface and the burr 78 on the inner surface are punched off.

Unlike a forged body which is formed from a billet having a volume corresponding to the volume of the final product by a plurality of forging processes, in the present invention, the billet material flows in a single direction toward the outer circumferential surface during the profile drawing process, and, since the outer circumferential surface is constrained during the pressing process, the billet material flows in a single direction toward the inner surface during the pressing process, wherein excessive burrs 56, 78 are removed after the respective profile drawing and pressing processes. Therefore, the final product does not require finishing, such as by cutting or grinding, but nevertheless maintains a highly accurate surface roughness and high dimensional accuracy.

The shape of the shaft 26 will be described below with reference to FIG. 32.

Figure 32:
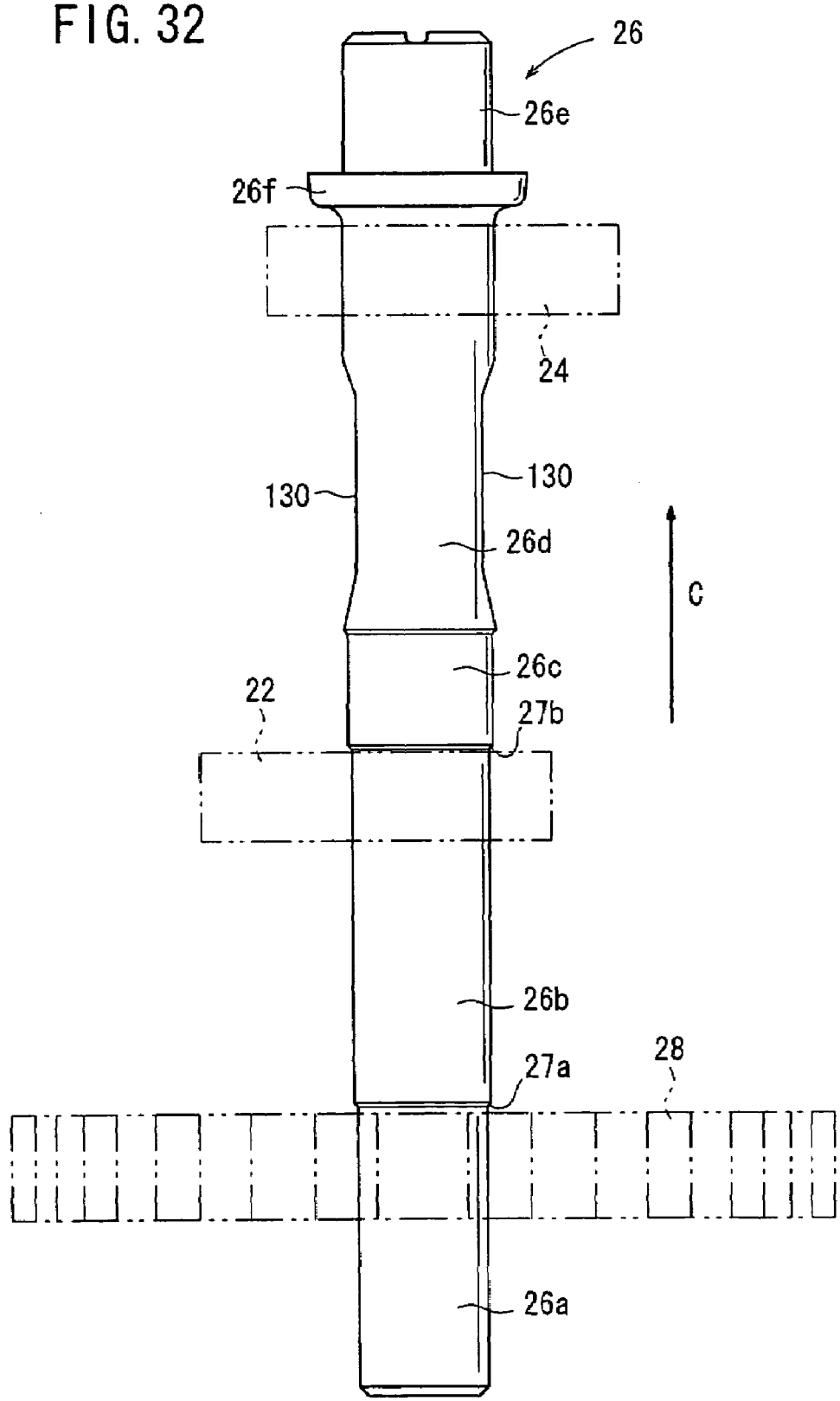
FIG. 32 is a side elevational view of a shaft.

As shown in FIG. 32, the shaft 26 has a first diameter portion 26a having a smallest diameter at the end on which the gear 28 is mounted. The shaft 26 also has a second diameter portion 26b positioned adjacent to the first diameter portion 26a in the direction indicated by the arrow C toward the other end 26e. The second diameter portion 26b has a diameter slightly greater than the first diameter portion 26a. The gear 28, when press-fitted over the first diameter portion 26a, is positioned by a small step 27a that is disposed between the first diameter portion 26a and the second diameter portion 26b. The shaft 26 also has a third diameter portion 26c positioned adjacent to the second diameter portion 26b in the direction indicated by the arrow C and having a diameter slightly greater than the second diameter portion 26b. The cam 22, when press-fitted over the second diameter portion 26b, is positioned by a small step 27b that is disposed between the second diameter portion 26b and the third diameter portion 26c.

The shaft 26 further has a fourth diameter portion 26d positioned adjacent to the third diameter portion 26c in the direction indicated by the arrow C and having a diameter slightly greater than the third diameter portion 26c. The fourth diameter portion 26d has two flat (cut) surfaces 130 parallel to the axis thereof for preventing the shaft 26 from interfering with an end of a connecting rod 33 (see FIG. 1) and hence allowing the camshaft 10 to be positioned closely to the connecting rod 33.

The shaft 26 has a flange 26f disposed between the fourth diameter portion 26d and the other end 26e, for positioning the shaft 26 when the camshaft 10 is assembled in the engine 12. The cam 24, when press-fitted over the fourth diameter portion 26d, is positioned by the flange 26f. In FIG. 32, the first through fourth diameter portions 26a through 26d are shown with exaggerated differences to indicate that they have different diameters, for easier understanding of the present invention. However, in actuality, the differences between the respective diameters are so small that the first through fourth diameter portions 26a through 26d appear to have substantially the same diameter.

A cutting jig 100 for forming the flat surfaces 130 on the shaft 26 will be described below with reference to FIG. 33.

Figure 33:
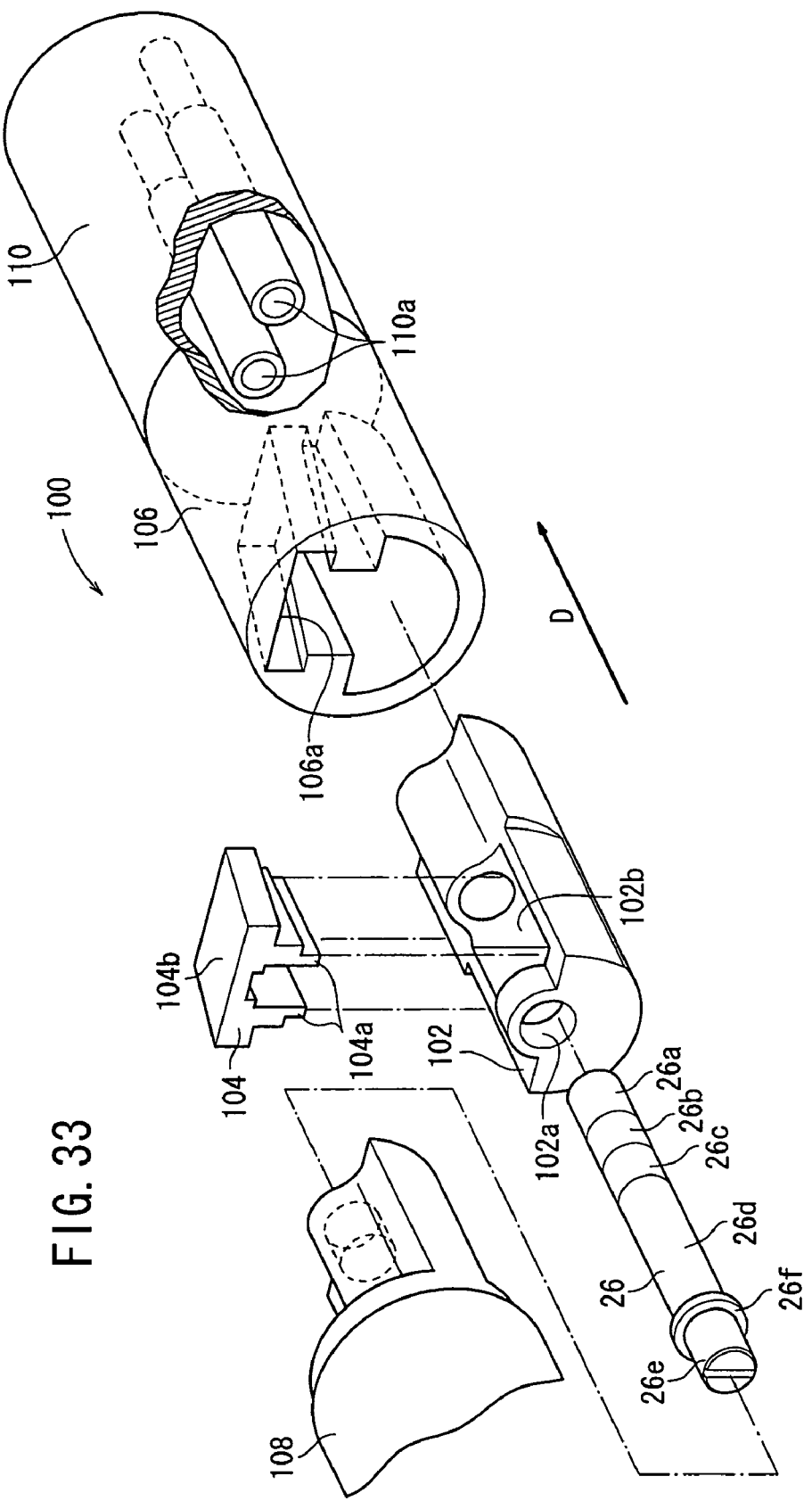
FIG. 33 is an exploded perspective view of a cutting jig for forming flat surfaces on the shaft.

As shown in FIG. 33, the cutting jig 100 comprises a workpiece holder 102 having a hole 102a for inserting the first through fourth diameter portions 26a through 26d therethrough, a cutter 104 for forming the flat surfaces 130, a holder guide 106 into which the workpiece holder 102 is slidably inserted, a movable die 108 for holding the other end 26e of the shaft 26 and pushing the workpiece holder 102 into the holder guide 106, and a back plate 110 having gas springs 110a, i.e., springs or other mechanism for forcibly returning the workpiece holder 102, and for pushing the workpiece holder 102 out of the holder guide 106 after the flat surfaces 130 have been formed on the shaft 26. The movable die 108, the workpiece holder 102, the holder guide 106, and the back plate 110 are successively arranged in the order described.

The hole 102a in the workpiece holder 102 has a portion where the fourth diameter portion 26d of the shaft 26 is inserted, the portion being held in communication with a hole 102b defined in the workpiece holder 102 for inserting the cutter 104 therein. The hole 102b is of a substantially elongate rectangular shape for setting the cutter 104, and communicates perpendicularly to the hole 102a.

The cutter 104 has two parallel blades 104a for cutting off portions of the shaft 26 to form the flat surfaces 130, and a slanted surface 104b inclined so as to become progressively closer to the axis of the workpiece holder 102 in the direction indicated by the arrow D toward the holder guide 106. The holder guide 106 has a guide surface 106b for abutment against the slanted surface 104b of the cutter 104, the guide surface 106b being inclined so as to become progressively closer to the axis of the holder guide 106 in the direction indicated by the arrow D.

A process of manufacturing the shaft 26, and a process of assembling the camshaft 10, will be described below with reference to FIGS. 34 through 39.

Figure 34:
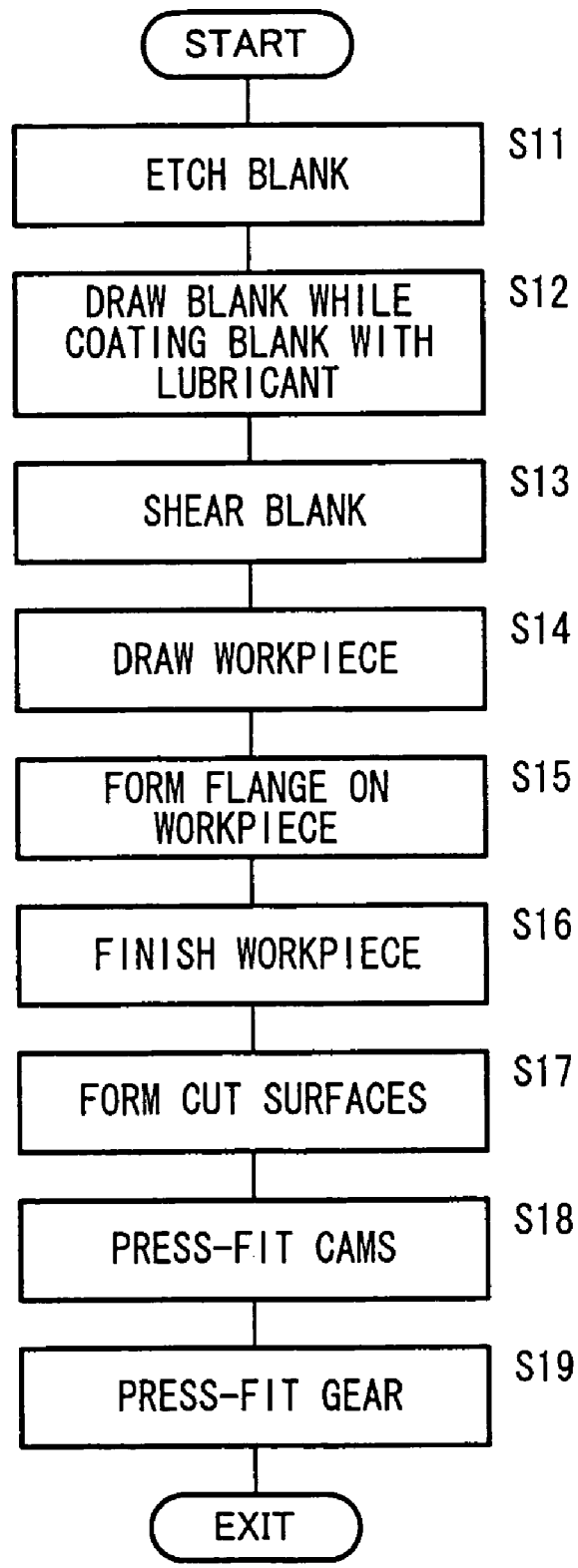
FIG. 34 is a flowchart of a process of forming a camshaft.

In step S11 shown in FIG. 34, a blank in the form of a round (cylindrical) rod of carbon steel is etched using oxalic acid to make the surface thereof porous. Alternatively, lime may be applied to a phosphate coating on the blank to make the surface thereof porous. However, etching the blank with oxalic acid is more effective to make the surface porous and hence is preferable to using the phosphate coating.

The carbon steel material making up the blank may be S35C, as referred to above. If liquid nitriding is performed on the blank, then the blank may be made of carbon steel having a lower carbon content.

Figure 35:
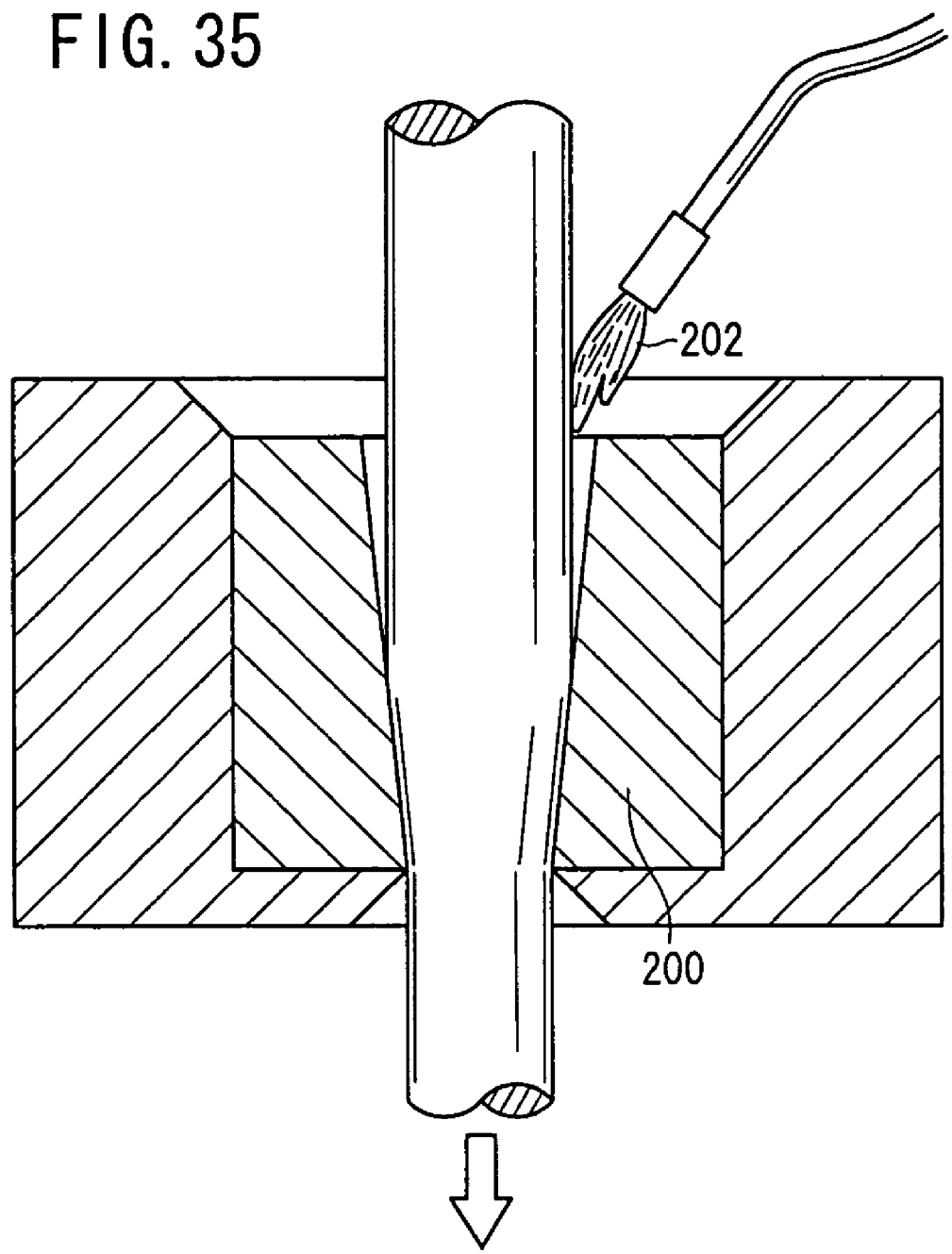
FIG. 35 is a view showing the manner in which a blank is drawn while being coated with a lubricant.
Figure 36:
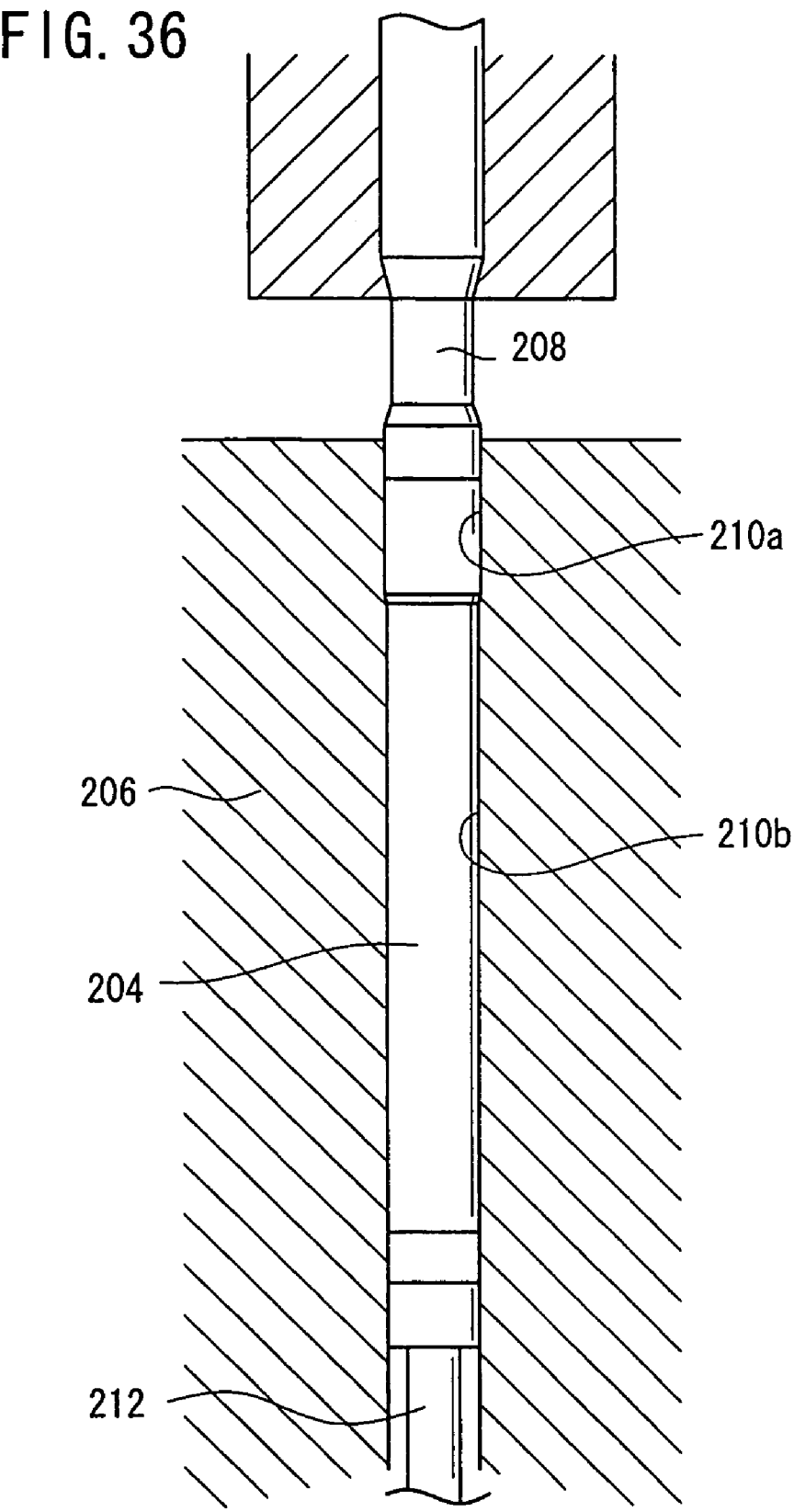
FIG. 36 is a view showing the manner in which a workpiece cut from the blank is drawn.

In step S12, the blank is drawn to a predetermined outside diameter using a die 200 (see FIG. 35). Before the blank is introduced into the die 200, the blank is lubricated by coating or ejecting a lubricant 202 onto the blank. Since the surface of the blank has been made porous in step S11, the lubricant 202 fills the pores, making the blank slidable against the die 200. Therefore, the blank can be drawn smoothly through the die 200. The lubricated blank is also prevented from seizure, thus prolonging its service life.

The lubricant 202 may comprise a powdery lubricant, such as lime or borax dissolved in water or the like, or processed into a paste. The powdery lubricant 202 makes the cams 22, 24 resistant to slippage in the circumferential direction of the shaft 26, allowing the camshaft 10 to rotate in synchronism with rotation of the crankshaft 14 when the camshaft 10 is assembled in the engine 12.

In step S12, the diameter of the shaft 26 is reduced as it is drawn, so it may be set at a small value for the purpose of filling the lubricant 202 in the blank.

In step S13, the blank is cut, for example by shearing, to a predetermined length, thus forming a workpiece 204 from which the shaft 26 is made.

In step S14, the workpiece 204 is drawn by cold forging (see FIG. 36) using a die 206 and a punch 208. The die 206 has a hole 210 therein, formed by a first hole 210a which is open upwardly and a second hole 210b which communicates with the first hole 210a and is slightly smaller in diameter than the first hole 210a. The first hole 210a serves to draw a portion of the workpiece 204 where the other end 26e and the flange 26f will be formed, and the second hole 210b serves to draw a portion of the workpiece 204 where the first through fourth diameter portions 26a through 26d will be formed.

The workpiece 204 is inserted into the hole 210 while being pushed downwardly axially by the punch 208, and is drawn into predetermined diameters by the first hole 210a and the second hole 210b.

After the workpiece 204 is drawn, the punch 208 is pulled back upwardly, and a knockout pin 212 positioned in a lower portion of the hole 210 is lifted to eject the workpiece 204 out of the hole 210.

In step S14, and subsequence steps S15 and S16, the workpiece 204 is inserted into dies 206, 214 and 230 with the portion thereof which will become the first diameter portion 26a being positioned downwardly and the portion which will become the other end 26e being positioned upwardly.

In step S15, the workpiece 204 is cold-forged to form a flange thereon, using a die 214 (see FIG. 37) having a hole 214a therein that is slightly smaller in diameter than the first hole 210a of the die 206, and further having a punch 216 with a bottomed hole 216a therein, which is of substantially the same diameter as the hole 214a.

Figure 37:
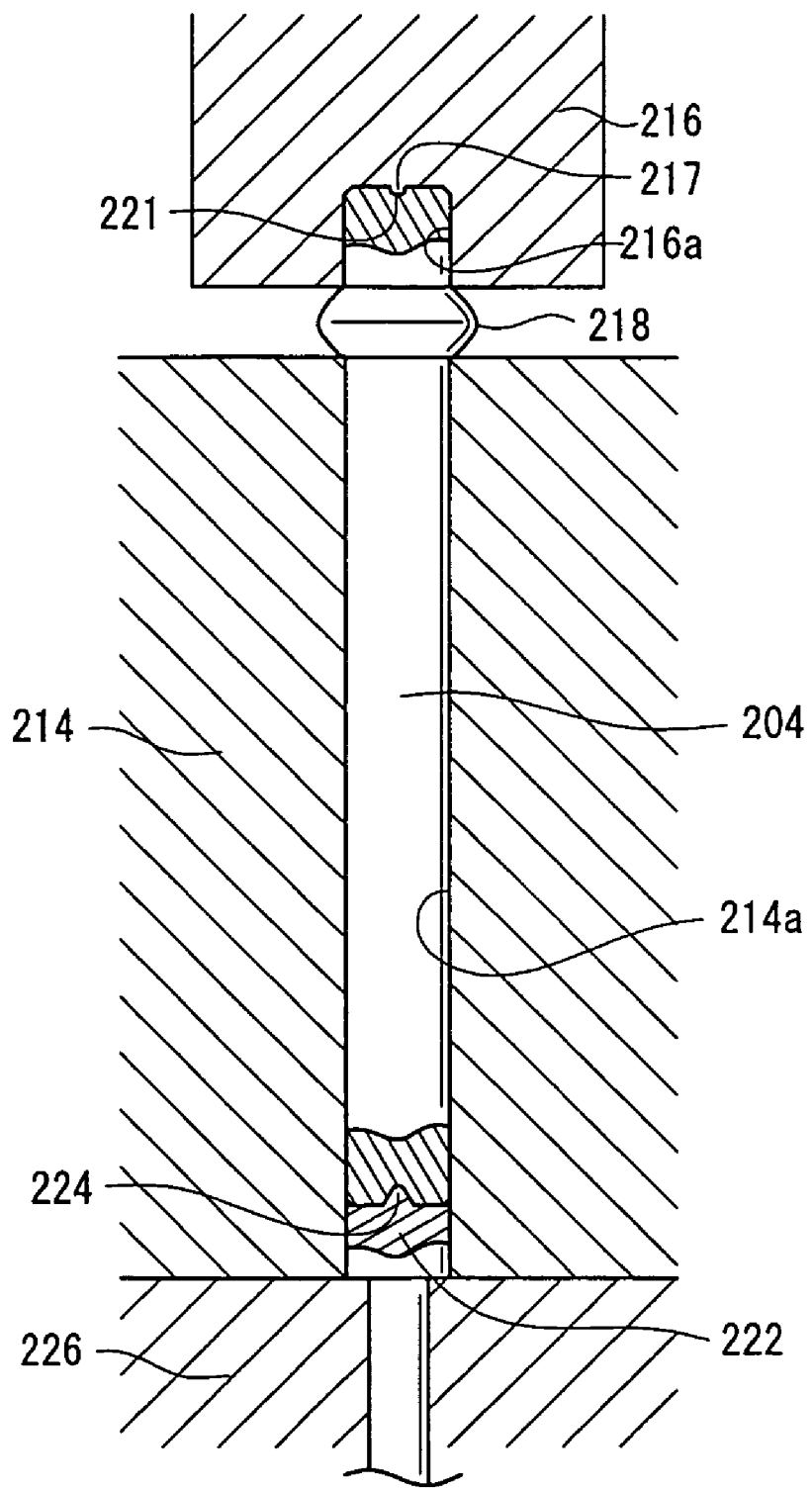
FIG. 37 is a view showing the manner in which the workpiece is machined to form a flange.

Specifically, as shown in FIG. 37, after the workpiece 204 is inserted into the hole 214a, the hole 216a in the punch 216 is aligned with the upper end of the workpiece 204, and the punch 216 is pressed axially downwardly until the upper end surface of the workpiece 204 abuts against the bottom of the hole 216a. The upper portion of the workpiece 204 is then drawn by the hole 216a, and a part of the workpiece 204 is plastically expanded radially outwardly to form an annular expanded portion 218 between the lower surface of the punch 216 and the upper surface of the die 214. The annular expanded portion 218 serves as a basis for the flange 26f.

The bottom of the hole 216a has a single ridge 217 extending through the center thereof. When the ridge 217 is pressed against the upper surface of the workpiece 204, it forms a central groove 221 in the upper surface of the workpiece 214, which acts as a stop for preventing the workpiece 204 from rotating.

A lower surface of the workpiece 204 is held against an upper surface of the knockout pin 222. The upper surface of the knockout pin 222 has a protrusion 224 disposed centrally thereon. When the protrusion 224 is inserted into a central hole defined in the lower surface of the workpiece 204, the protrusion 224 serves to prevent the workpiece 204 from wobbling. Since the knockout pin 222 is supported by a bolster 226, the knockout pin 222 reliably presses the lower surface of the workpiece 204 to prevent the workpiece 204 from being displaced, so that the expanded portion 218 is formed reliably.

The groove 221 formed by the ridge 217 of the punch 216 can also be used to inspect the displacement accuracy of the workpiece 204, so that a displaced state of the workpiece 204 can be corrected, if necessary, based on the results of the inspection.

After the workpiece 204 has been formed in the above manner, the punch 216 is pulled back upwardly, and the knockout pin 222 is lifted to eject the workpiece 204 out of the hole 214a.

Figure 38:
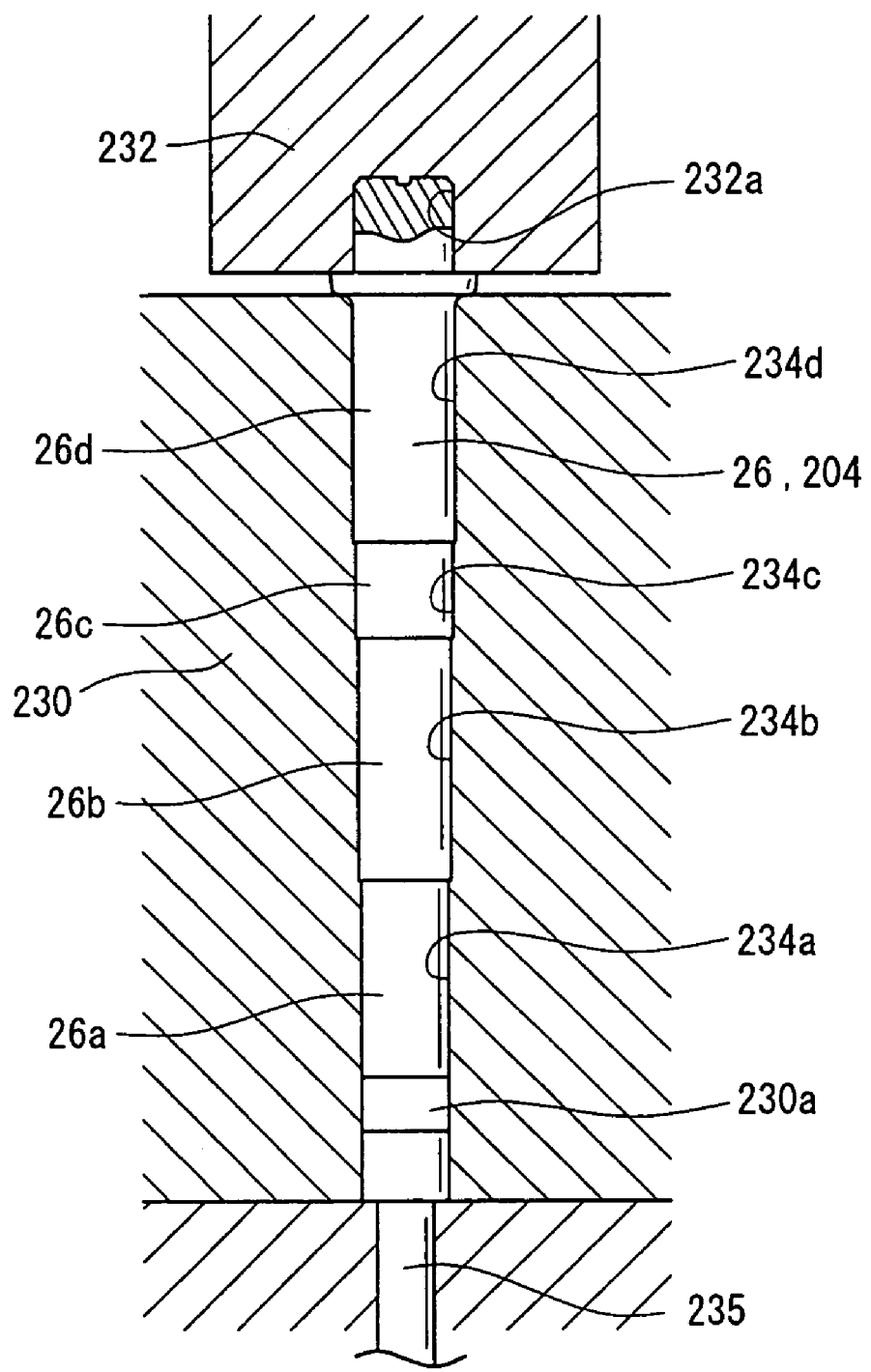
FIG. 38 is a view showing the manner in which the workpiece is finished.

Then, in step S16, the workpiece 204 is finished by cold forging using a die 230 and a punch 232 (see FIG. 38).

The die 230 has a hole 230a defined therein, which includes a first diameter portion 234a, a second diameter portion 234b, a third diameter portion 234c, and a fourth diameter portion 234d, arranged successively upwardly in the order named. These first through fourth diameter portions 234a through 234d draw the workpiece 204 to form the first diameter portion 26a, the second diameter portion 26b, the third diameter portion 26c, and the fourth diameter portion 26d, respectively. After step S16, the basic configuration of the shaft 26 is now formed.

Figure 39:
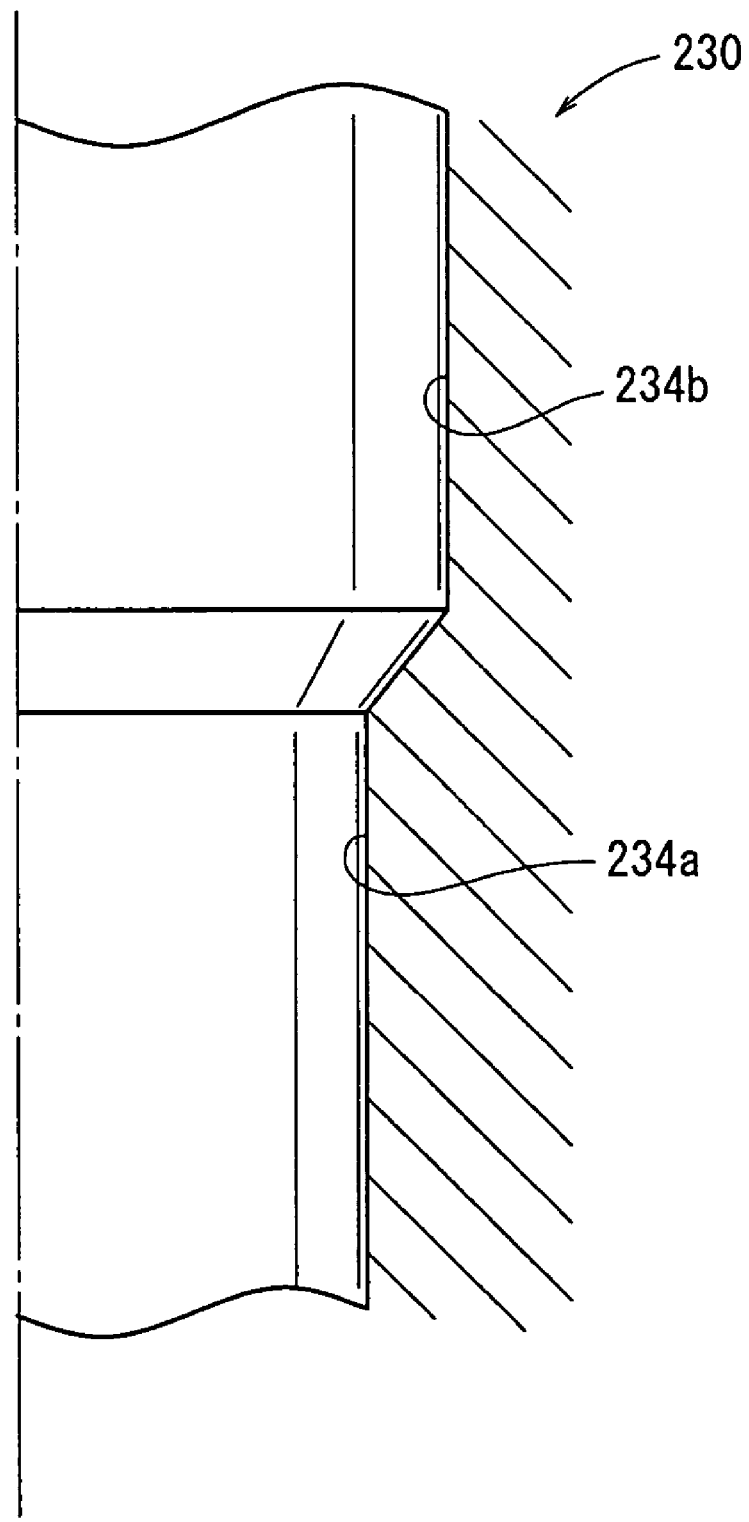
FIG. 39 is an enlarged cross-sectional view of a step of a die.

As shown in FIG. 39 in enlarged scale, the step between the first diameter portion 234a and the second diameter portion 234b of the die 230 is tapered downwardly for smoothly drawing the workpiece 204. The steps between the second through fourth diameter portions 234b through 234d are similarly tapered.

The punch 232 has a bottomed hole 232a defined therein. The workpiece 204 is inserted into the hole 230a, and the hole 232a is aligned with the upper surface of the workpiece 204. When the punch 232 is pressed downwardly, the bottom of the hole 232a presses the upper surface of the workpiece 204, and the workpiece 204 is drawn and finished by the hole 230a. At this time, the expanded portion 218 is sandwiched between the lower surface of the punch 232 and the upper surface of the die 230, and is axially compressed. The material of the expanded portion 218 plastically flows radially outwardly into a flat shape, thus forming the flange 26f. The finished workpiece 204 serves as the shaft 26.

After being finished in step S16, the punch 232 is pulled back upwardly, and a knockout pin 235 disposed in a lower portion of the hole 230a is lifted to eject the shaft 26 out of the hole 230a.

The shaft 26 is thereby formed by successive cold-forging processes. Since the workpiece 204 is coated with the lubricant 202 in step S12, the successive cold-forging processes can be performed smoothly without danger of possibly cracking the workpiece 204 or creating flaws in the workpiece 204. The lubricant 202 is also effective to prevent the dies 200, 206, 214, 230 and the punches 208, 216, 232 from suffering seizure. The cold-forging processes do not require heating, and hence processes or facilities for performing heating are not required.

Because the lubricant 202 is filled in the pores formed in the surface of the workpiece 204, following step S12, the lubricant 202 can effectively perform a lubricating function in steps S13 through S16. If necessary, however, the workpiece 204 and the dies and punches may be coated with working oil, such as header oil or the like, for providing auxiliary lubrication and cooling during such steps.

Then, in step S17, the two flat (cut) surfaces 130 are formed on the fourth diameter portion 26d of the shaft 26 by the cutting jig 100 (see FIG. 33).

Specifically, the first through fourth diameter portions 26a through 26d of the shaft 26 are inserted into the hole 102a of the workpiece holder 102.

Then, the cutter 104 is set in the hole 102b of the workpiece holder 102. At this time, the two blades 104a abut against the fourth diameter portion 26d parallel to the shaft 26.

Then, while the movable die 108 holds the other end 26e of the shaft 26, the workpiece holder 102 and the cutter 104 are pressed into the hole of the holder guide 106. The movable die 108 exerts drive forces sufficiently greater than the spring forces of gas springs 110a, thus reliably moving the workpiece holder 102 and the cutter 104 in the direction indicated by the arrow D.

As the workpiece holder 102 moves in the direction indicated by the arrow D, the slanted surface 104b of the cutter 104 is guided by the guide surface 106a and is progressively displaced along the hole 102b in a radial direction perpendicular to the direction indicated by the arrow D. When the workpiece holder 102 and the cutter 104 are sufficiently displaced in the direction indicated by the arrow D, the blades 104a cut off opposite sides of the fourth diameter portion 26d, forming the flat surfaces 130.

Thereafter, the movable die 108 is pulled back to allow the workpiece holder 102 to return under the bias of the gas springs 110a. After the cutter 104 is removed from the workpiece holder 102, the shaft 26 is pulled out of the hole 102a.

Using the cutting jig 100, flat surfaces 130 can be formed on the shaft 26 in a simple process, by setting the shaft 26 and the cutter 104 in the workpiece holder 102 and then moving the workpiece holder 102 in the direction indicated by the arrow D.

Since flat surfaces 130 are formed when the side portions of the shaft 26 are cut off by the blades 104a of the cutter 104, the shaft 26 is free of plastic deformation such as expansion or the like. Accordingly, dimensional accuracy of the shaft 26, which has been formed in the processes up to step S17, can be maintained.

The cut-off portions are discharged along a predetermined path defined in the die.

In step S18, the cams 22, 24 are successively press-fitted over the shaft 26.

The cam 22 is press-fitted up to a position on the fourth diameter portion 26d and positioned by the flange 26f. The cam 24 is press-fitted up to a position on the second diameter portion 26b, and positioned by the step formed between the second diameter portion 26b and the third diameter portion 26c.

Then, in step S19, the gear 28 is press-fitted over the shaft 26. The metal bushing 28a of the gear 28 is press-fitted over the first diameter portion 26a, and positioned by the step formed between the first diameter portion 26a and the second diameter portion 26b. In steps S18 and S19, the cams 22, 24 and the gear 28 are press-fitted over the shaft 26 at appropriate respective angles or phases around the axis of the shaft 26. At this time, the flat surfaces 130 of the shaft 26 may be used as reference surfaces for establishing the angles of the cams 22, 24 and the gear 28.

If the cams 22, 24 and the gear 28 were to slip, due to lubricating action of the lubricant 202 applied to the shaft 26 in step S12, then the camshaft 10 and the crankshaft 14 would be brought out of synchronism with each other. In view of such a problem, the inventor of the present invention conducted tests in which various lubricants were applied to the shaft 26, wherein torques causing the cams 22, 24 and the gear 28 of the camshaft 10 to slip in the circumferential direction were determined.

The test results indicated that when a bonderizing process is carried out, by applying a metallic soap as a lubricant to a general phosphoric acid coating, sufficient slip torques in the circumferential direction were not obtained, which allowed the cams 22, 24 and the gear 28 to slip. In contrast, when the lubricant 202, in the form of a powdery lubricant, such as lime or borax dissolved in water or the like, was used, sufficient slip torques in the circumferential direction were obtained, confirming that reference slip torques, required for assembling the camshaft 10 in the engine 12 (see FIG. 1), were satisfied.

Specifically, when a powdery lubricant is used, the powdery lubricant only physically attaches to the surface of the blank, and tends to fall off the surface of the blank when the blank is cold-forged. Thus, when the cams and the gears are subsequently press-fitted over the workpiece, they are less liable to slip due to large tightening forces. If a chemically bonded lubricant, such as a stearic-acid metallic soap is used (bonderized), then since it remains unremoved when the blank is cold-forged, the cams and the gears that are subsequently press-fitted over the workpiece are more prone to slippage.

Since a phosphoric acid coating is applied for facilitating bonding to the metallic soap, it is preferable to use oxalic acid for etching the blank.

According to an experiment, if the lubricant 202 has a coefficient of friction in the range from 0.03 to 0.07, which is equivalent to that which is provided by a bonderizing process, then the lubricant provides sufficient lubrication for the workpiece 204 when it is cold-forged.

As described above, the cams 22, 24 and the gear 28 are press-fitted over the shaft 26 in steps S18 and S19, and do not need to be separately fixed in position. Therefore, the camshaft 10 can be fabricated with high productivity. Furthermore, the cams 22, 24 and the gear 28 do not require a separate rotation prevention mechanism, such as a key, a screw, or require fixation based on plastic machining, brazing, or the like, and hence processes for forming such a rotation prevention mechanism can be dispensed with. Consequently, the shapes of the cams 22, 24 and the gear 28 can be simplified.

The shaft 26 can be fabricated with high productivity, because it is basically formed by cold forging alone, and does not require other machining steps such as cutting, etc. Because the blank from which the shaft 26 is formed is coated with the lubricant 202, it can be cold-forged easily and smoothly.

The lubricant 202 is in the form of a powdery lubricant dissolved in water or the like, and provides sufficient slip torques for the cams 22, 24 and the gear 28 that are press-fitted over the shaft 26. Therefore, operation of the camshaft 10 is kept in synchronism with the crankshaft 14.

The processes involved in forming the shaft 26 may successively be performed by a single machine. For example, after the workpiece 204, having a predetermined length, is cut off from the blank in step S13, the processes in steps S14 through S17 may be performed by a single machine (including the cutting jig 100), to process the workpiece 204 while feeding the workpiece 204 successively through the processes performed by the machine.

The camshaft 10 is illustrated as being used in the single-cylinder engine 12. If the camshaft 10 is used in an engine having two or more cylinders, then the number of cams of the camshaft 10 may be increased depending on the number of cylinders of the engine.

The invention claimed is:

1. A method of manufacturing a cam for a camshaft of an engine, comprising the steps of:
    performing preliminary profile upsetting on a forging blank having a volume which is greater than a final product by a predetermined amount, thereby forming a first cold-forged body which is thicker than the final product,
    said first cold-forged body having a rough shape which has an outer profile greater than that of the final product; performing profile drawing on said first cold-forged body to form a second cold-forged body, said second cold-forged body having excessive material that has flowed along a profile of an outer circumferential surface that corresponds to a shape of the final product being formed as a burr on an outer surface thereof;
    punching said second cold-forged body to form inner and outer surfaces simultaneously thereon, thereby forming a third cold-forged body with said burr removed from the outer surface, said third cold-forged body further having a relief hole which is smaller in diameter than a shaft insertion hole for the camshaft;
    pressing said third cold-forged body to form a fourth cold-forged body having a predetermined thickness and including an excessive material formed as a burr on the inner surface thereof, while an outer circumferential surface of said third cold-forged body is constrained by a die surface;
    punching said fourth cold-forged body to remove said burr from said inner surface, thereby forming a fifth cold-forged body having a hole corresponding to said shaft insertion hole; and
    ironing said fifth cold-forged body simultaneously on inner and outer surfaces thereof, thereby forming a final product.

2. A method according to claim 1, wherein when the preliminary profile upsetting is performed on the forging blank, first and second beveled facets are formed on peripheral portions of said first cold-forged body.

3. A method according to claim 2, wherein said first beveled facet is formed on a peripheral portion of a first surface of the first cold-forged body, which is positioned near the burr formed by profile drawing on the outer surface, and said second beveled facet is formed on a peripheral portion of a second surface of the first cold-forged body opposite to said first surface, said first beveled facet having an area greater than said second beveled facet.

* * * * *

UNITED STATES PATENT AND TRADEMARK OFFICE
CERTIFICATE OF CORRECTION

PATENT NO.      : 7,628,129 B2
APPLICATION NO. : 10/582708
DATED           : December 8, 2009
INVENTOR(S)     : Takeshima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 426 days.

Signed and Sealed this

Second Day of November, 2010

David J. Kappos
*Director of the United States Patent and Trademark Office*